United States Patent
Xu et al.

(10) Patent No.: US 10,558,386 B2
(45) Date of Patent: Feb. 11, 2020

(54) OPERATION DEVICE AND OPERATION SYSTEM

(71) Applicants: Kabushiki Kaisha Toshiba, Minato-Ku, Tokyo (JP); Toshiba Electronic Devices & Storage Corporation, Minato-Ku, Tokyo (JP)

(72) Inventors: Hui Xu, Kanagawa (JP); Yasuki Tanabe, Kanagawa (JP); Toru Sano, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 8 days.

(21) Appl. No.: 15/923,521

(22) Filed: Mar. 16, 2018

(65) Prior Publication Data
US 2019/0095130 A1  Mar. 28, 2019

(30) Foreign Application Priority Data

Sep. 22, 2017  (JP) .................... 2017-182766
Jan. 15, 2018  (JP) .................... 2018-003972

(51) Int. Cl.
*G06F 12/00* (2006.01)
*G06F 3/06* (2006.01)
(Continued)

(52) U.S. Cl.
CPC .......... *G06F 3/0656* (2013.01); *G06F 3/0613* (2013.01); *G06F 3/0673* (2013.01);
(Continued)

(58) Field of Classification Search
CPC .... G06F 3/0656; G06F 3/0613; G06F 3/0673; G06N 3/0454; G06N 3/063; G06N 3/08
See application file for complete search history.

(56) References Cited

U.S. PATENT DOCUMENTS 9,361,534 B2      6/2016  Mizuno et al.
2004/0103095 A1*  5/2004  Matsugu ............ G06K 9/00281
2016/0358069 A1  12/2016  Brothers et al.

FOREIGN PATENT DOCUMENTS

JP   11-184841 A   7/1999
JP   4947983 B2    6/2012
JP   5911165 B2    4/2016

OTHER PUBLICATIONS

Tianshi Chen et al., "DianNao: A Small-Footprint High-Throughout Accelerator for Ubiqutous Machine-Learning," ASPLOS, Mar. 1, 2014, pp. 1-15.

(Continued)

*Primary Examiner* — Shawn X Gu
(74) *Attorney, Agent, or Firm* — White & Case LLP

(57) ABSTRACT

An operation device according to an embodiment includes an operation instruction circuit, an operation circuit, a buffer and a storage area instruction circuit. The operation instruction circuit issues an operation instruction for an operation type of either one of a first operation and a second operation. The operation circuit performs an operation in accordance with the operation instruction, and outputs an intermediate operation result. The buffer stores the intermediate operation result. The storage area instruction circuit specifies an area within the buffer in Which the intermediate operation result is stored, according to the operation type.

15 Claims, 21 Drawing Sheets

(51) Int. Cl.
*G06N 3/04* (2006.01)
*G06N 3/063* (2006.01)
*G06N 3/08* (2006.01)

(52) U.S. Cl.
CPC ........... *G06N 3/0454* (2013.01); *G06N 3/063* (2013.01); *G06N 3/08* (2013.01)

(56) References Cited

OTHER PUBLICATIONS

Maurice Peemen et al., "Memory-Centric Accelerator Design for Convolutional Neural Networks", 2013 IEEE 31st International Conference on Computer Design (ICCD), Oct. 1, 2013, pp. 13-19.
Baoyuan Liu et al., "Sparse Convolutional Neural Networks", 2015 IEEE Conference on Computer Vision and Pattern Recognition (CVPR), IEEE, Jun. 7, 2015, pp. 806-814.
Extended European Search Report dated Sep. 26, 2018 issued in corresponding European Patent Application No. 18162305.9.

\* cited by examiner

OPERATION DEVICE AND OPERATION SYSTEM

CROSS-REFERENCE TO RELATED APPLICATIONS

This application is based upon and claims the benefit of priority from the Japanese Patent Applications No. 2017-182766, filed on Sep. 22, 2017 and No. 2018-3972; filed on Jan. 15, 2018; the entire contents of which are incorporated herein by reference.

FIELD

Embodiments described herein relate generally to an operation device and an operation system.

BACKGROUND

Neural networks are used as one of the technologies which realize recognition or identification from images and sounds. For example, Convolutional neural network is constituted by consecutively arranging layers such as a convolutional layer and a fully connected layer, and recognition and identification processing is realized by performing convolution operations and fully connected operations.

In a neural network, during the convolution operation or a fully connected operation, temporary saving of an intermediate operation result to a memory occurs, and frequencies of reading from and writing to the memory may increase. In addition, the frequency of reading from the memory may also increase due to repeating the reading of input feature maps and weights multiple times. The power consumption may increase due to such increases in the frequencies of reading from and writing to the memory.

DETAILED DESCRIPTION

Figure 1:
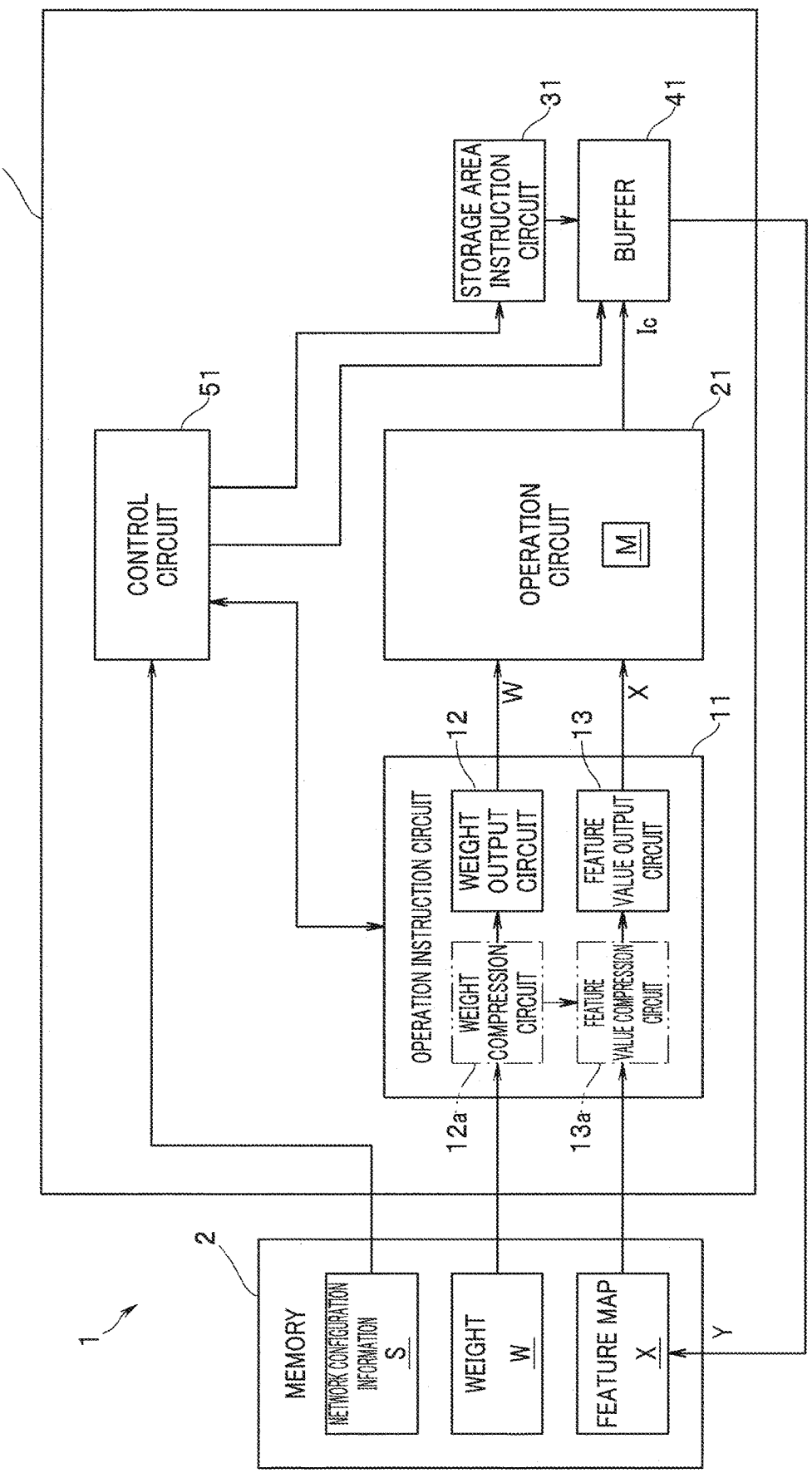
FIG. 1 is a block diagram illustrating an example of the configuration of an operation system according to a first embodiment.

An operation device according to embodiments described herein includes an operation instruction circuit, an operation circuit, a buffer and a storage area instruction circuit. The operation instruction circuit issues an operation instruction for an operation type of either one of a first operation and a second operation. The operation circuit performs an operation according to the operation instruction, and outputs an intermediate operation result. The buffer stores the intermediate operation result. The storage area instruction circuit specifies an area within the buffer in which the intermediate operation result is stored, according to the operation type.

(First Embodiment)
(Configuration)

Hereunder, an embodiment is described referring to the drawings.

FIG. 1 is a block diagram illustrating the configuration of an operation system 1 according to a first embodiment. In descriptions of the embodiments and modifications, the term "feature maps X" denotes all or a part of feature maps and feature values, the term "weights W" denotes all or a part of weights, the term "operation elements M" refers to all or a part of operation elements, the term "area B" refers to all or a part of an area, and the term "operation result Y" refers to all or a part of operation results.

The operation system 1 includes a memory 2 and an operation device 3. The operation device 3 is connected to the memory 2, and reads various kinds of information from the memory 2 and performs an operation.

Network configuration information S, weights W and feature maps X are stored in the memory 2, which is constituted by, for example, an SRAM. The network configuration information S, the weights W and the feature maps X are created in advance by machine learning.

The network configuration information S is information regarding the configuration of a network on which the operation device 3 performs processing. The network configuration information S includes a sequence of operations, operation types, and identification information for the weights W (hereunder, referred to as "weight identification information").

The operation device 3 performs a first operation and a second operation based on the network configuration information S read from the memory 2. For example, the first operation is a convolution operation Cv, and the second operation is a fully connected operation Fc. The operation device 3 includes an operation instruction circuit 11, an operation circuit 21, a storage area instruction circuit 31, a buffer 41 and a control circuit 51. The control circuit 51 is connected to each circuit inside the operation device 3, and is capable of controlling the operations of each circuit.

Figure 2:
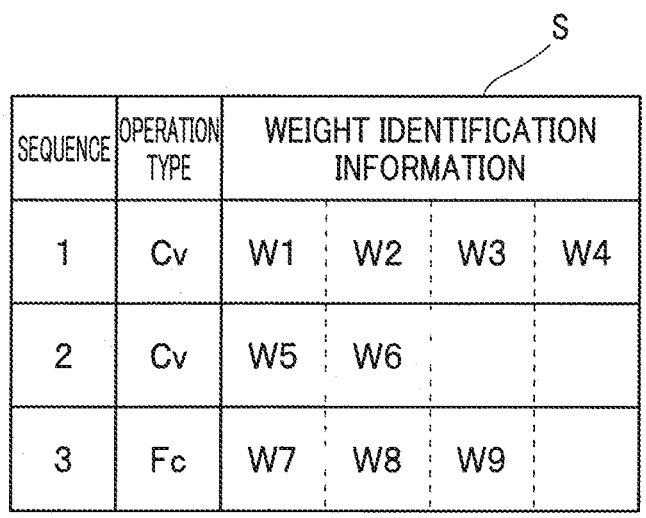
FIG. 2 is a table for describing an example of an operation sequence of the operation system according to the first embodiment.

FIG. 2 is a table for describing an example of an operation sequence of the operation system 1 according to the first embodiment. According to the example in FIG. 2, the operation system 1 is configured so that a convolution operation Cv is performed twice, and a fully connected operation Fc is performed once. (Sequential order 1 and sequential order 2 indicate operations for the same network layer and the same feature map.) In the operation performed in sequential order 1, the operation device 3 reads feature maps X and weights W1, W2, W3 and W4 that have been set in advance from the memory 2, performs a convolution operation Cv, and writes an operation result Y to the memory 2. Next, in the operation performed in sequential order 2, the operation device 3 reads the operation result Y obtained by the operation in sequential order 1 from the memory 2, reads weights W5 and W6 from the memory 2, and performs a convolution operation Cv. Next, in the operation performed in sequential order 3 (a different network layer), the operation device 3 reads the operation result Y that has been written in the memory 2 by the operation performed in sequential order 2 from the memory 2 as a feature map X, and also reads weights W7, W8 and W9 from the memory 2, performs a fully connected operation Fc, and writes the operation result Y that is the final output to the memory 2.

The operation instruction circuit 11 includes a weight output circuit 12 and a feature value output circuit 13. The operation instruction circuit 11 reads weights W and feature maps X from the memory 2 in accordance with the network configuration information S, and outputs the weights W and the feature maps X to the operation circuit 21. More specifically, the operation instruction circuit 11 reads the weights W and the feature maps X from the memory 2 in accordance with an operation type and weight identification information inputted from the control circuit 51, and issues an operation instruction for either one of the first operation and the second operation by outputting the weights W and the feature maps X that are read to the operation circuit 21.

The weight output circuit 12 reads weights W from the memory 2, and outputs the weights W to an operation element M.

The feature value output circuit 13 reads feature maps X from the memory 2, and outputs the feature maps X to the operation element M.

The operation instruction circuit 11 outputs output destination information that is information indicating the operation element M that is the output destination to the control circuit 51. Note that the operation instruction circuit 11 may be configured to output the output destination information to the storage area instruction circuit 31 in a manner that bypasses the control circuit 51.

That is, the operation instruction circuit 11 issues an operation instruction for an operation type of either one of the first operation and the second operation to the operation circuit 21. More specifically, in accordance with the network configuration information S that shows the operation sequence of the first operation and the second operation, the operation instruction circuit 11 reads weights W and feature maps X that are in accordance with an operation type of either one of the first operation and the second operation from the memory 2, and issues an operation instruction by outputting the read weights W and feature maps X to the operation circuit 21.

The operation circuit 21 carries out an operation with respect to the inputted weights W and feature maps X in accordance with the operation instruction, and outputs an intermediate operation result Ic to the buffer 41. The operation circuit 21 has a plurality of operation elements M that perform a sum-of-product operation.

That is, the operation circuit 21 performs an operation in accordance with the operation instruction, and outputs the intermediate operation result Ic to the buffer 41.

The respective operation elements M accumulate the respective inputted weights W and respective feature maps X, add together the accumulation results, and calculate the intermediate operation result Ic.

Based on the inputted operation type and output destination information, the storage area instruction circuit 31 determines an area B in which the intermediate operation result Ic is stored, and specifies the area B to the buffer 41.

That is, in accordance with the operation type, the storage area instruction circuit 31 specifies the storing area B within the buffer 41 in which the intermediate operation result Ic is stored.

The buffer 41 includes the area B that stores the intermediate operation result Ic. Based on the instruction from the storage area instruction circuit 31, the butler 41 adds the value of the intermediate operation result Ic to the value stored in the area B, and stores back the result of the addition in the designated area B. When a predetermined operation ends, the buffer 41 outputs the value stored in the area B designated by the storage area instruction circuit 31 to the memory 2 as the operation result Y.

The control circuit 51 reads the network configuration information S from the memory 2. Based on the network configuration information S, the control circuit 51 outputs an operation type and weight identification information to the operation instruction circuit 11. Further, the control circuit 51 outputs the operation type and output destination information inputted from the operation instruction circuit 11 to the storage area instruction circuit 31.

(Convolution Operation Cv)

The convolution operation Cv of the operation system 1 will now be described using FIG. 3 to FIG. 7. FIG. 3 to FIG. 6 are explanatory diagrams for describing an example of the convolution operation Cv of the operation system 1 according to the first embodiment.

Figure 3:
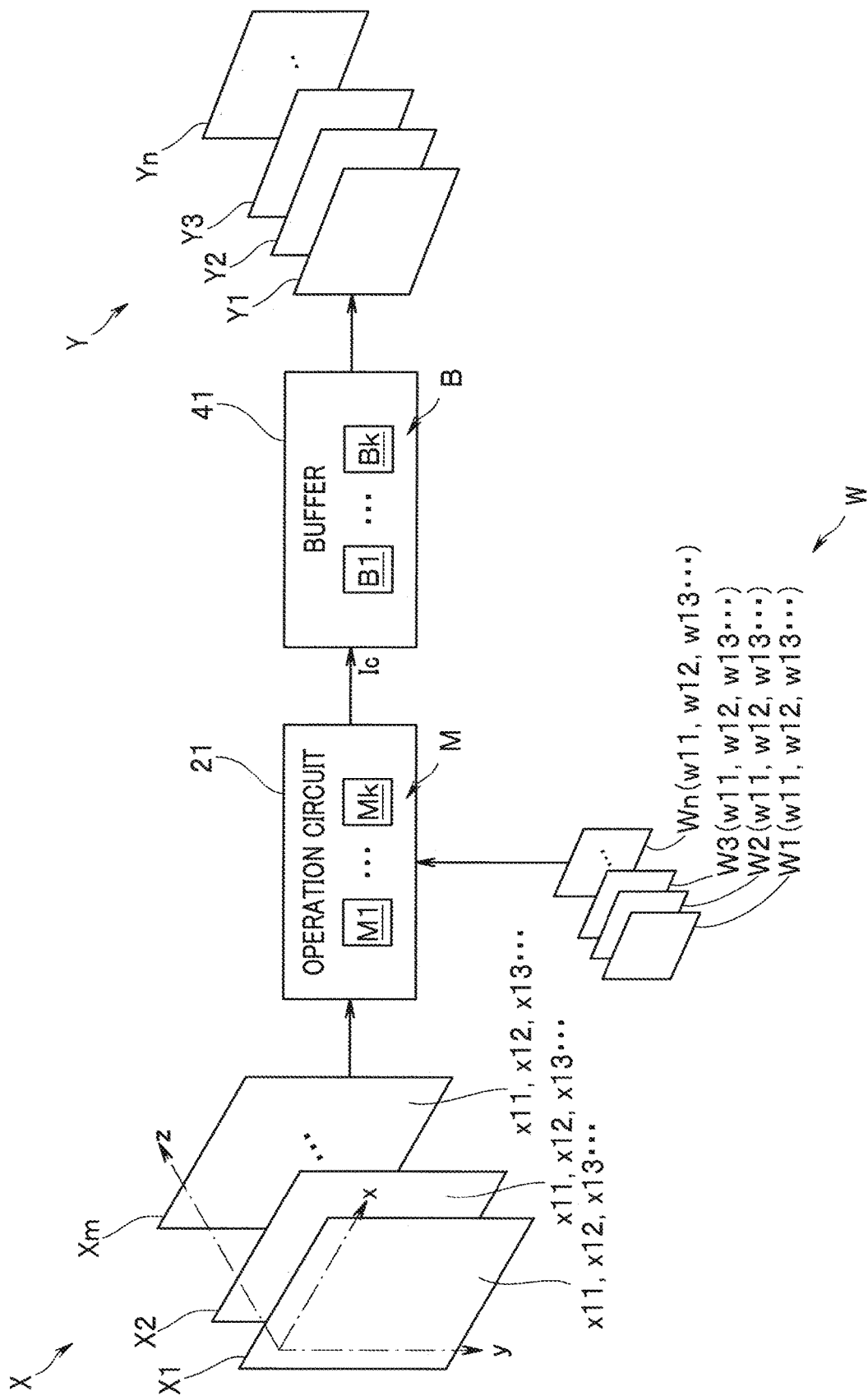
FIG. 3 is a view for describing an example of a convolution operation of the operation system according to the first embodiment.
Figure 4:
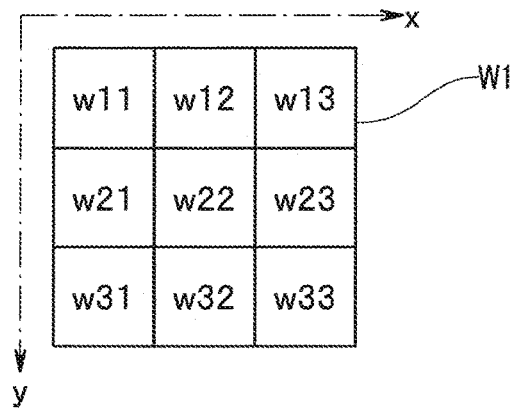
FIG. 4 is a view for describing an example of a convolution operation of the operation system according to the first embodiment.

As illustrated in FIG. 3, in the convolution operation Cv, feature maps X1 to Xm of m channels and weights W1 to Wn of n sets are inputted to the operation circuit 21. As illustrated in FIG. 4, one set of weights W is constituted by a two-dimensional array defined by x-y coordinates. Further, as illustrated in FIG. 3, the feature maps X are constituted by a three-dimensional array defined by x-y-z coordinates. In the feature maps X, the z-direction shows the number of channels.

In the convolution operation Cv, the number of sets of the operation results Y is determined according to the number of sets of the weights W. Further, the number of areas B is set in accordance with correspondence areas C of the feature map X for one channel.

In the convolution operation Cv, a sum-of-product operation is performed based on the weights W and the feature map X of the correspondence areas C that correspond with the weights W. For example, in Equation (1), a sum-of-product operation with respect to weights W1 (FIG. 4) and a feature map X1 (hatched region in FIG. 5) of the correspondence areas C that correspond to the weights W1 is shown. The intermediate operation result Ic calculated by the sum-of-product operation is stored in an area B1. A matrix W1 is a matrix of the weights W1, and a matrix X1$a$ is a feature map X of correspondence areas C that correspond to the weights W1. Further, w11 to w33 denote values included in the weights W1, and x11 to x55 denote values included in the feature map X1. The area B where the intermediate operation result Ic is to be stored is shown within a bracket on the left side.

$$Ic(B1) = w11 \times x11 + w12 \times x12 + \ldots + w33 \times x33 = \quad (1)$$
$$\text{matrix } W1[w11, w12, \ldots, w33] \cdot \text{matrix } X1a[x11, x12, \ldots, x33]$$

Next, the correspondence areas C are slid by one position in the x-direction (hatched region in FIG. 6), and an intermediate operation result Ic that is to be stored in area B2 is calculated as shown in Equation (2).

$$Ic(B2) = w11 \times x12 + w12 \times x13 + \ldots w33 \times x34 = \quad (2)$$
$$\text{matrix } W1[w11, w12, \ldots, w33] \cdot \text{matrix } X1a[x12, x13, \ldots, x34]$$

Figure 8:
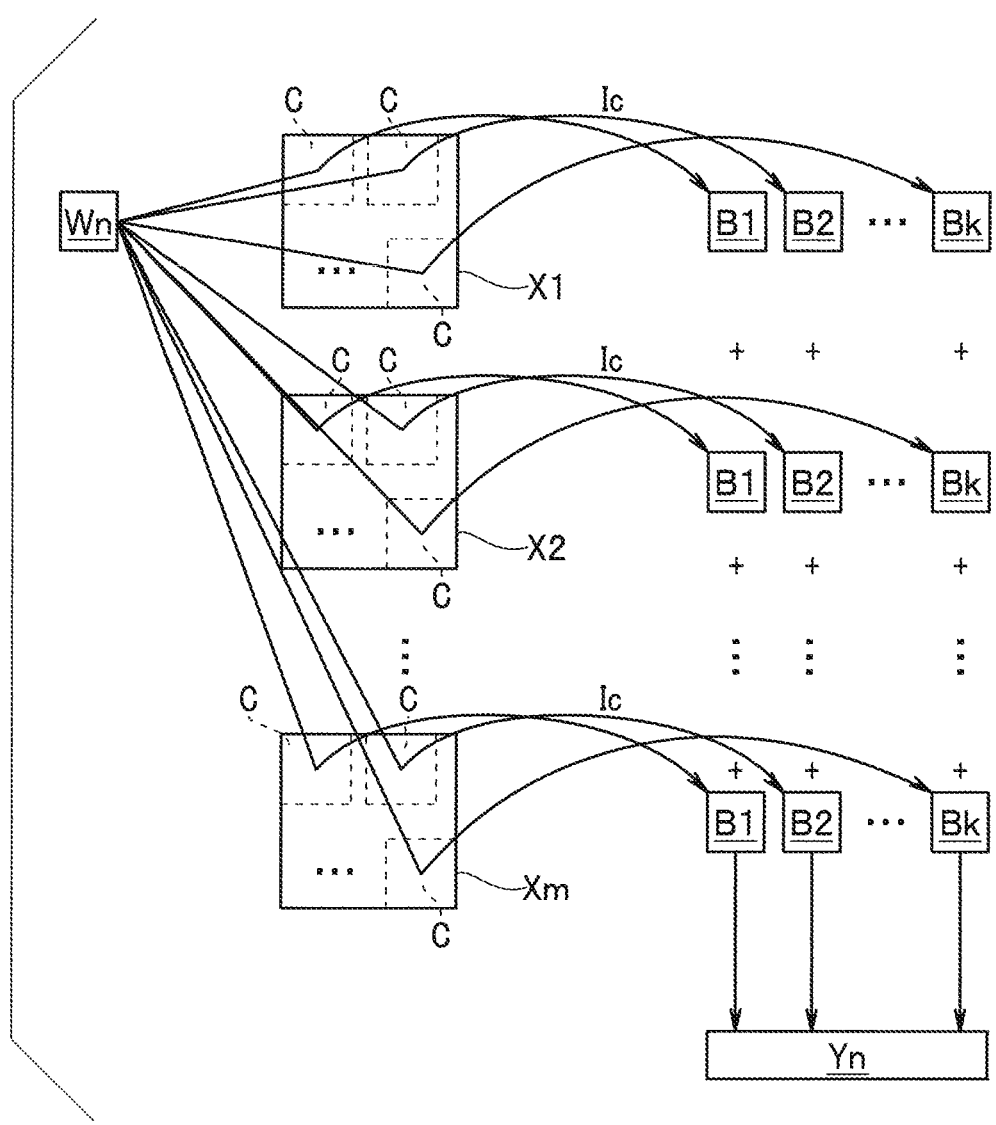
FIG. 8 is a view for describing an example of a convolution operation of the operation system according to the first embodiment.

That is, the inside of the feature map X1 is scanned in the x direction and the y direction to read the values in the correspondence areas C, and operations with the weights W1 are performed by operation elements M1 to M9, and intermediate operation results Ic are stored in areas B1 to B9. When the operations for the feature map X1 end, the inside of the feature map X2 is scanned in the x direction and the y direction to read the values in the correspondence areas C, and operations with the weights W1 are performed. Similarly, with respect to feature maps X3 to Xm, operations are performed with the weights W1, and intermediate operation results Ic are cumulatively added to the areas B1 to B9. As illustrated in an example in FIG. 7, an operation result Y1 is generated by operations using the weights W1. Further, as illustrated in an example in FIG. 8, an operation result Yn is generated by operations using weights Wn.

Figure 5:
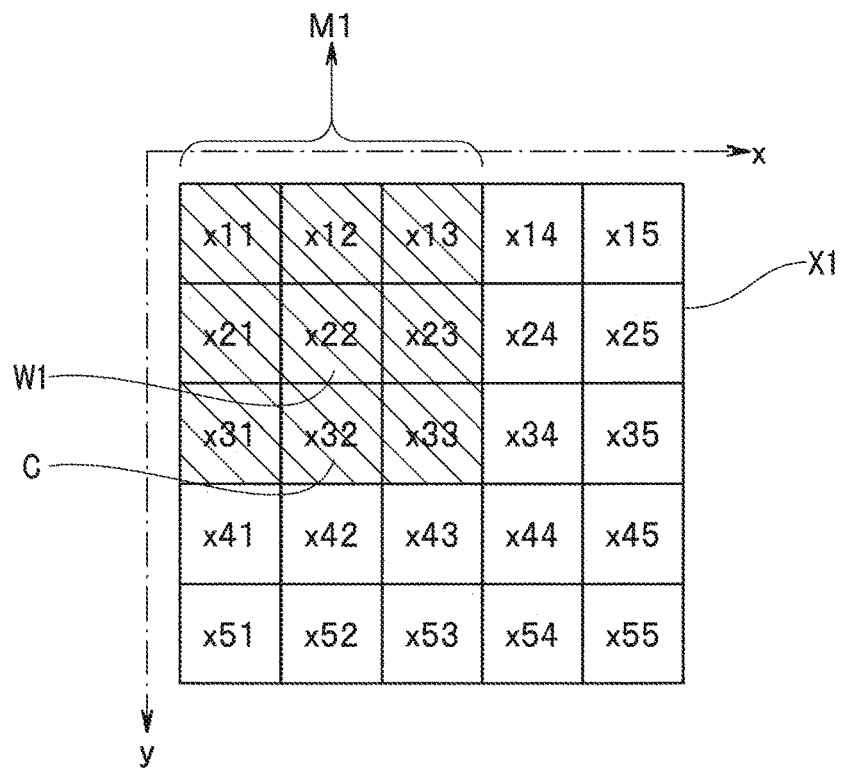
FIG. 5 is a view for describing an example of a convolution operation of the operation system according to the first embodiment.
Figure 6:
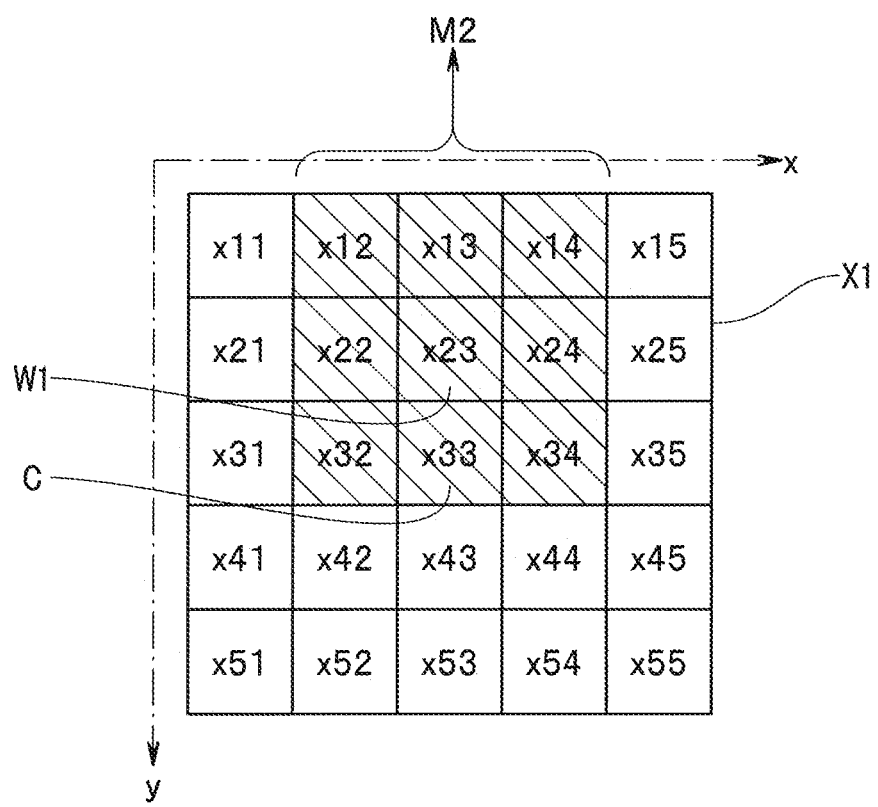
FIG. 6 is a view for describing an example of a convolution operation of the operation system according to the first embodiment.
Figure 7:
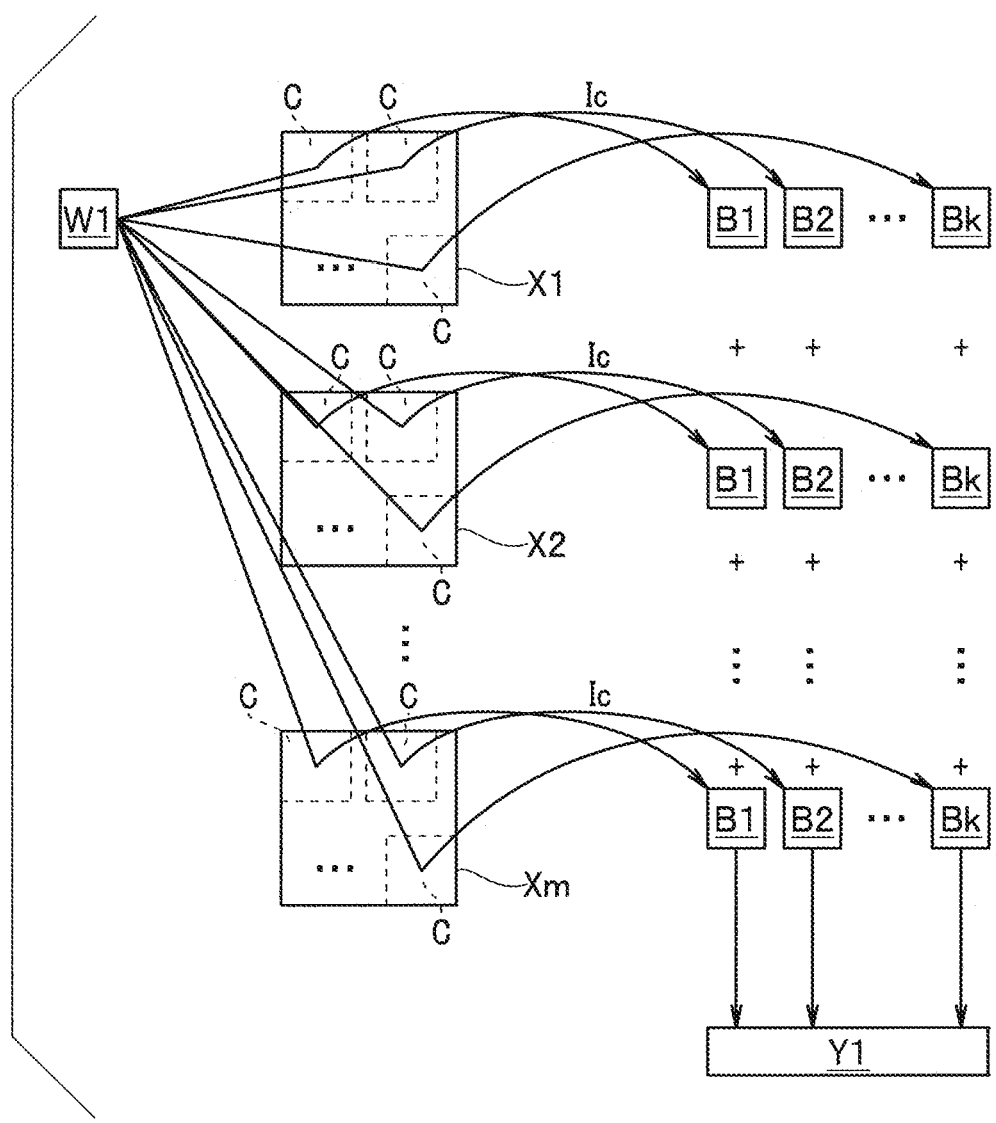
FIG. 7 is a view for describing an example of a convolution operation of the operation system according to the first embodiment.

Note that, in the examples in FIG. 5 and FIG. 6, although the number of sliding positions in each of the x direction and the y direction on the feature map X is one, the number of sliding positions may be two or more. The same also applies with respect to the other embodiments and modifications.

Figure 9:
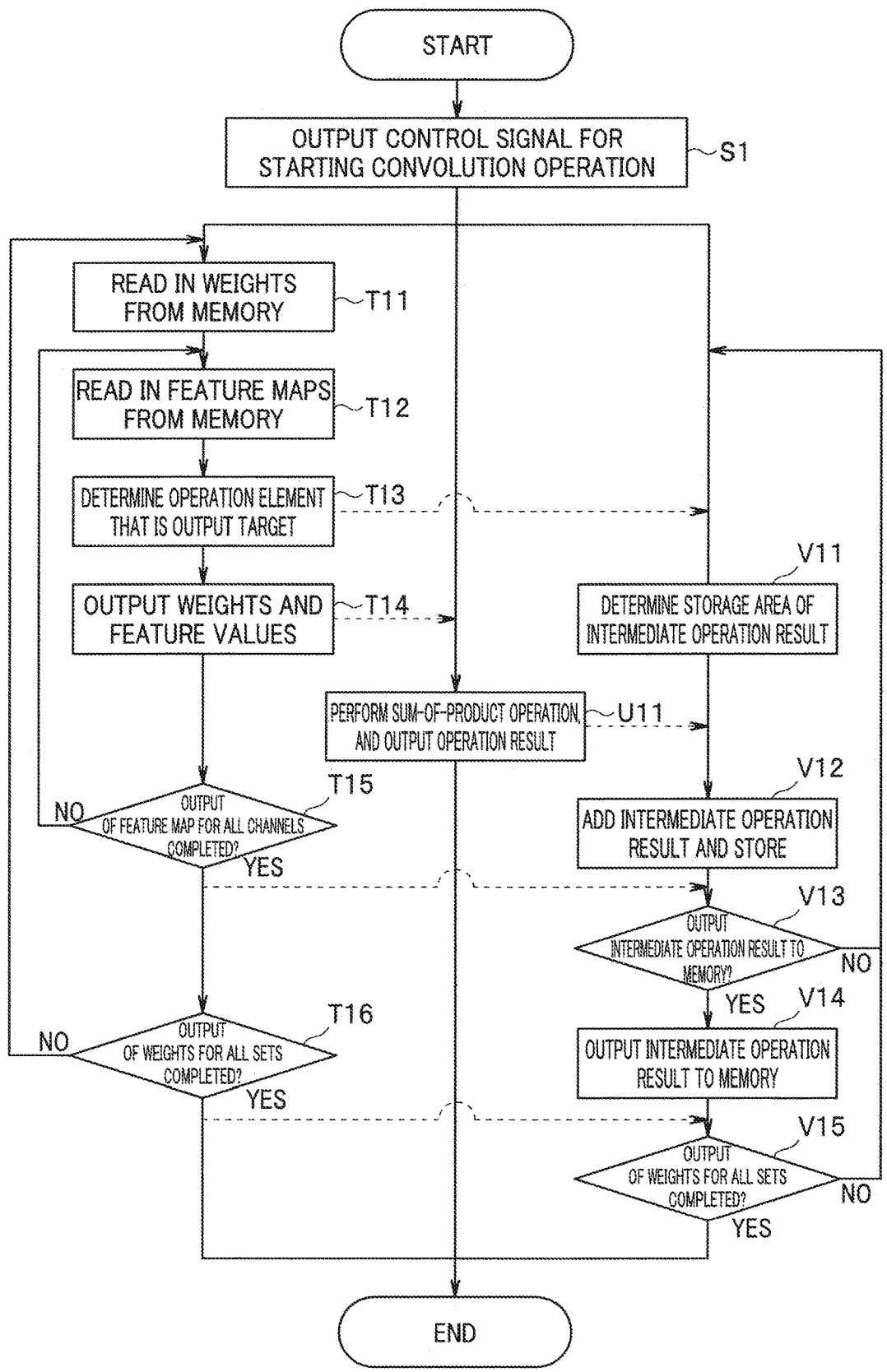
FIG. 9 is a flowchart for describing an example of a convolution operation of the operation system according to the first embodiment.

FIG. 9 is a flowchart for describing an example of operations during a convolution operation Cv of the operation system 1 according to the first embodiment. The control circuit 51 outputs a control signal for starting a convolution operation Cv (S1). Based on the network configuration information S read from the memory 2, the control circuit 51 outputs information regarding the operation type that indicates the convolution operation Cv, and weight identification information to the operation instruction circuit 11.

The operation instruction circuit 11 reads weights W from the memory 2 (T11). In the example in FIG. 2, weights W1 to W4 are read. The operation instruction circuit 11 reads the feature maps X from the memory 2 (T12).

The operation instruction circuit 11 determines the operation element M that is the output destination (T13). Specifically, the operation instruction circuit 11 determines the operation element M that is the output destination of the weights W and the feature map X. For example, in the example shown in FIG. 5, the operation element M1 is determined as the output destination of the weights w11 to w33 and feature values x11 to x33. Further, in the example shown in FIG. 6, the operation element M2 is determined as the output destination of the weights w11 to w33 and feature values x12 to x34. The information regarding the output destination is outputted to the storage area instruction circuit 31 through the control circuit 51 (dashed line in FIG. 9).

The operation instruction circuit 11 outputs the weights W and the feature map X (T14).

The operation instruction circuit 11 determines whether or not outputting of the feature maps X of all channels is completed (T15). If the outputting of the feature maps X of all channels is not completed (115—No), the operation instruction circuit 11 returns to T12. By repeating the processing of T12 to T15, the feature value output circuit 13 reads feature maps X from the memory 2 that are divided for each channel. For example, in the first time the processing is performed, the feature value output circuit 13 reads the feature map X1. When the processing is the $m^{th}$ repetition, the feature value output circuit 13 reads the feature map Xm.

On the other hand, when the outputting of the feature maps X of all channels is completed (T15—Yes), the operation instruction circuit 11 outputs a control signal for outputting the intermediate operation result Ic to the memory 2, to the buffer 41 through the control circuit 51, and proceeds to T16.

The operation instruction circuit 11 determines whether or not the outputting of the weights W of all sets is completed (T16). If the outputting of the weights W of all sets is not completed (T16—No), the operation instruction circuit 11 returns to T11. On the other hand, when the outputting of the weights W of all sets is completed (T16—Yes), the operation instruction circuit 11 outputs a control signal indicating that the outputting of the weights W of all sets is completed to the buffer 41 through the control circuit 51, and ends the processing.

That is, in the convolution operation Cv, the operation instruction circuit 11 reads in feature values x of correspondence areas C of the feature maps X corresponding to the weights W from the memory 2. More specifically, after the operation instruction circuit 11 scans the inside of the feature map X in the x direction and the y direction to read the feature map X, the operation instruction circuit 11 slides in the z-direction to perform the next scanning in the x direction and the y direction.

At the operation circuit 21, a sum-of-product operation or the inputted weights W and feature maps X is performed by the operation elements M, and an intermediate operation result Ic is outputted to the buffer 41 (U11).

Based on information regarding the output destination inputted from the operation instruction circuit 11, the storage area instruction circuit 31 determines an area B in which the intermediate operation result Ic is stored (V11). That is, in the convolution operation Cv, an area B of the intermediate operation result Ic is determined in accordance with the correspondence areas C (result of operation for each block). The buffer 41 adds the intermediate operation result Ic to the value in the area B that is determined and stores the resulting value in the area B (V12).

The buffer 41 determines whether or not to output the intermediate operation result Ic to the memory 2 based on a control signal inputted from the operation instruction circuit 11 in T15 (V13). When the result in V13 is "No", the buffer 41 returns to V11. On the other hand, when the result in V13 is "Yes", the buffer 41 outputs the intermediate operation result Ic to the memory 2 (V14). After the intermediate operation result Ic is outputted to the memory 2, the area B is cleared. That is, in the convolution operation Cv, when an operation that is based on one set of weights W ends, the buffer 41 outputs the intermediate operation result Ic to the memory 2.

The buffer 41 determines whether or not outputting for the weights W of all sets has been completed based on a control signal inputted from the operation instruction circuit 11 in T16 (V15). If outputting for the weights W of all sets has not been completed (V15—No), the buffer 41 returns to V11. On the other hand, if outputting for the weights W of all sets has been completed (V15—Yes), the processing ends.

(Fully Connected Operation Fc)

Figure 10:
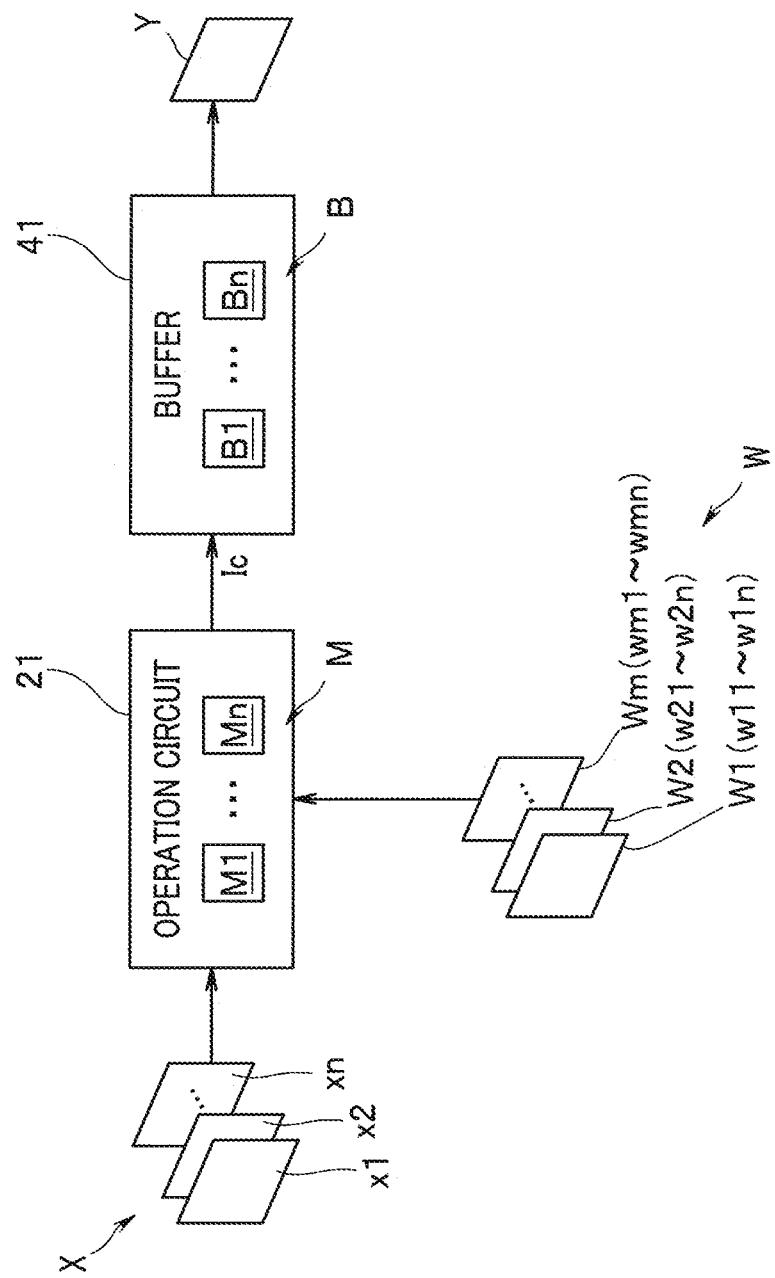
FIG. 10 is a view for describing an example of a fully connected operation of the operation system according to the first embodiment.
Figure 11:
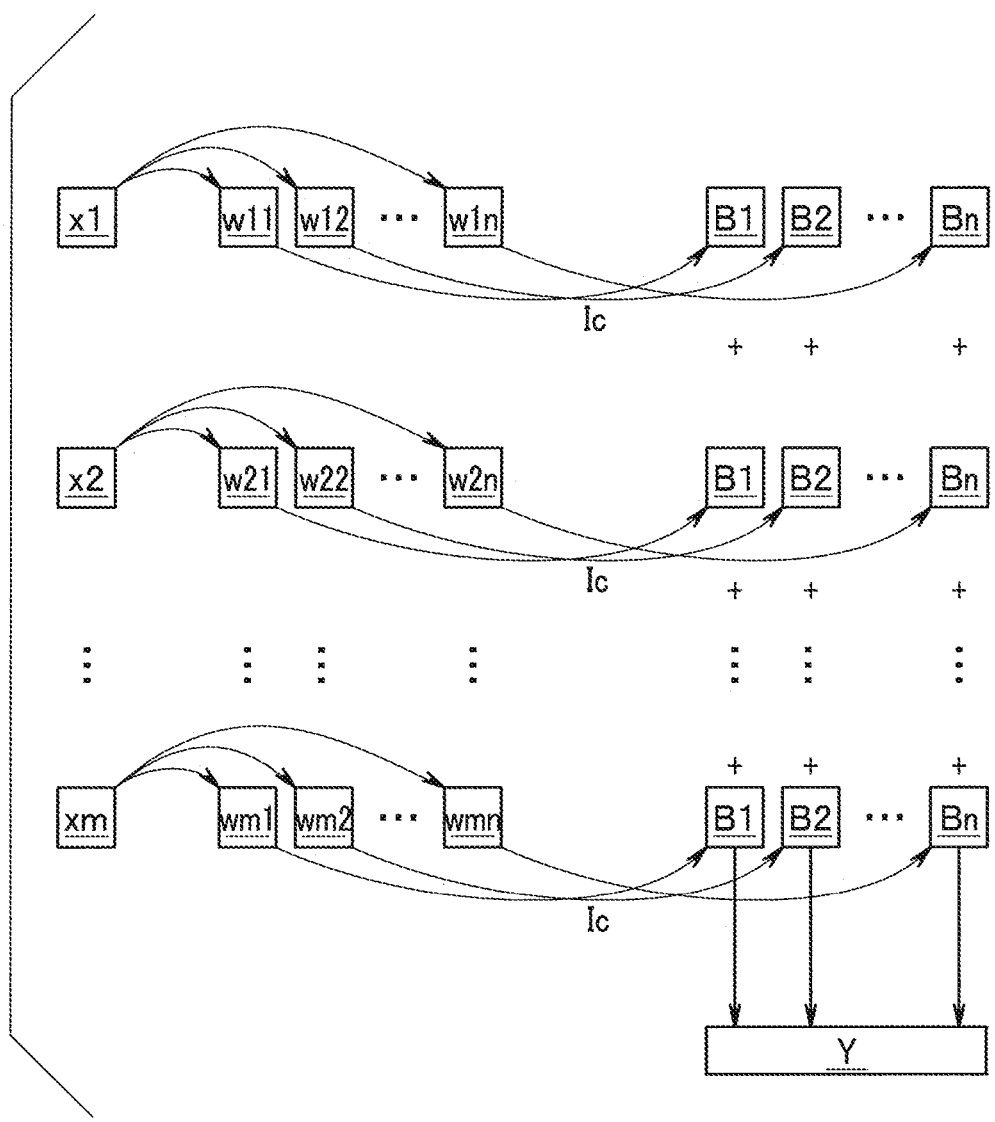
FIG. 11 is a view for describing an example of a fully connected operation of the operation system according to the first embodiment.

A fully connected operation Fc of the operation system 1 will now be described. FIG. 10 and FIG. 11 are explanatory diagrams for describing an example of the fully connected operation Fc of the operation system 1 according to the first embodiment.

As illustrated in FIG. 10, feature maps x1 to xn of n channels, and weights W1 to Wn of n sets are used in the fully connected operation Fc. The operation circuit 21 performs an operation by means of operation elements M1 to Mn, and outputs intermediate operation results Ic to the buffer 41. The buffer 41 stores the intermediate operation results Ic in areas B1 to Bn.

In the fully connected operation Fc, the number of channels of feature maps X, the number of sets of weights W, and the numbers of operation elements M and areas B are the same. In the fully connected operation Fc, the intermediate operation results Ic stored in the areas B1 to Bn are totaled and the operation result Y is outputted to the memory 2.

Next, the flow of the fully connected operation Fc of the operation system 1 will be described.

Figure 12:
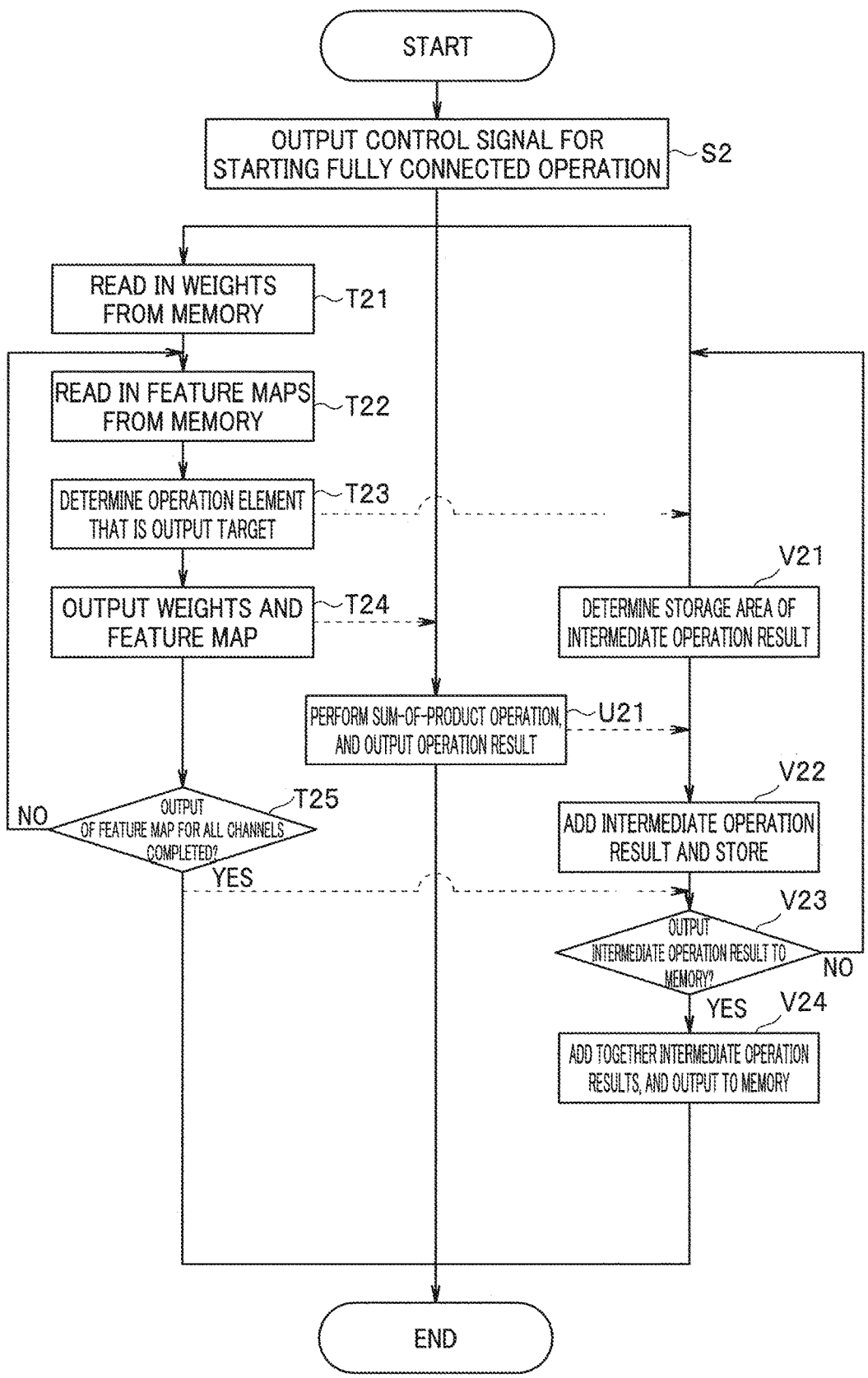
FIG. 12 is a flowchart for describing an example of a fully connected operation of the operation system according to the first embodiment.

FIG. 12 is a flowchart for describing an example of the fully connected operation Fc of the operation system 1 according to the first embodiment.

The control circuit 51 outputs a control signal for starting the fully connected operation Fc (S2). Based on the network configuration information S read from the memory 2, the control circuit 51 outputs information regarding the operation type that indicates the fully connected operation Fc, and weight identification information to the operation instruction circuit 11.

The operation instruction circuit 11 reads the weights W from the memory 2 (T21). In the example for the operation performed in sequential order 3 in FIG. 2, weights W7 to W9 are read from the memory 2 by the weight output circuit 12. For example, weights w71 to w7n are included in weights W7, weights w81 to w8n are included in weights W8, and weights w91 to w9n are included in weights W9.

The operation instruction circuit 11 reads a feature map X for one channel from the memory 2 (T22). Feature values x are included in the feature map X.

The operation instruction circuit 11 determines the operation element M that is the output destination (T23). As illustrated in FIG. 11, in the fully connected operation Fc, for example, the operation instruction circuit 11 accumulates a feature value x1 with each of weights w11 to w1n, and stores the intermediate operation results Ic in areas B1 to Bn. Next, the operation instruction circuit 11 accumulates a feature value x2 with each of weights w21 to w2n, and adds the intermediate operation results Ic to the values of the areas B1 to Bn. The processing is repeated from the feature value x1 to feature value xm, and the values of the areas B1 to Bn are then totaled and the operation result Y is outputted to the memory 2.

Therefore, for example, in the first processing of the repeated processing, the operation instruction circuit 11 determines an operation element M1 as the output destination for the feature value x1 and a weight w71, determines an operation element M2 as the output destination for the feature value x1 and a weight w72, and determines an operation element Mn as the output destination for the feature value x1 and a weight w7n. in the second processing of the repeated processing, the operation instruction circuit 11 determines the operation element M1 as the output destination for the feature value x2 and a weight w81, determines the operation element M2 as the output destination for the feature value x2 and a weight w82, and determines the operation element Mn as the output destination for the feature value x2 and a weight w8n. In the third processing of the repeated processing, the operation instruction circuit 11 determines the operation element M1 as the output destination for the feature value x3 and a weight w91, determines the operation element M2 as the output destination for the feature value x3 and a weight w92, and determines the operation element Mn as the output destination for the feature value x3 and a weight w9n. The information regarding the output destinations is also outputted to the storage area instruction circuit 31 through the control circuit 51.

The operation instruction circuit 11 outputs weights W and a feature map X for a single channel (T24).

The operation instruction circuit 11 determines whether or not outputting of the feature maps X of all channels is completed (T25). If outputting of the feature maps X of all channels is not completed, the processing returns to T22. On the other hand, if outputting of the feature maps X of all channels is completed, the operation instruction circuit 11 outputs a control signal for outputting the intermediate operation results Ic to the memory 2, to the buffer 41 through the control circuit 51, and the processing then ends.

The processing in U21 and V21 to V23 is the same as the processing in U11 and V11 to V13, and hence a description of the processing is omitted here.

The buffer 41 adds together the intermediate operation results Ic, and outputs the resulting value to the memory 2 (V24). That is, in the fully connected operation Fc, when an operation that is based on the feature maps X of all channels and the weights W of all the sets has been completed, the buffer 41 outputs the intermediate operation results Ic to the memory 2.

By the above-described manner, at the operation device 3, the outputs of weights W and feature maps X to the operation circuit 21 can be changed according to the operation type, and both the convolution operation Cv and the fully connected operation Fc can be performed by the operation circuit 21. Further, at the operation device 3, intermediate operation results Ic are added to the values of the buffer 41 and the resulting values are stored in the buffer 41. Accordingly, at the operation device 3, the areas B of the buffer 41 can be made smaller, and the frequency of outputting from the buffer 41 to the memory 2 can also be reduced.

According to the first embodiment, the operation device 3 can perform a plurality of types of operations, and the frequencies of reading from and writing to the memory 2 can be reduced and power consumption can thus be suppressed.

(Modification of First Embodiment)

Although in the first embodiment the operation device 3 performs an operation with respect to all of the weights W and feature maps X read froth the memory 2, an operation with respect to 0 values may be omitted if 0 values are included in the weights W. In the description of the present modification, descriptions of components that are the same as components in other embodiments or modifications are omitted.

Figure 13:
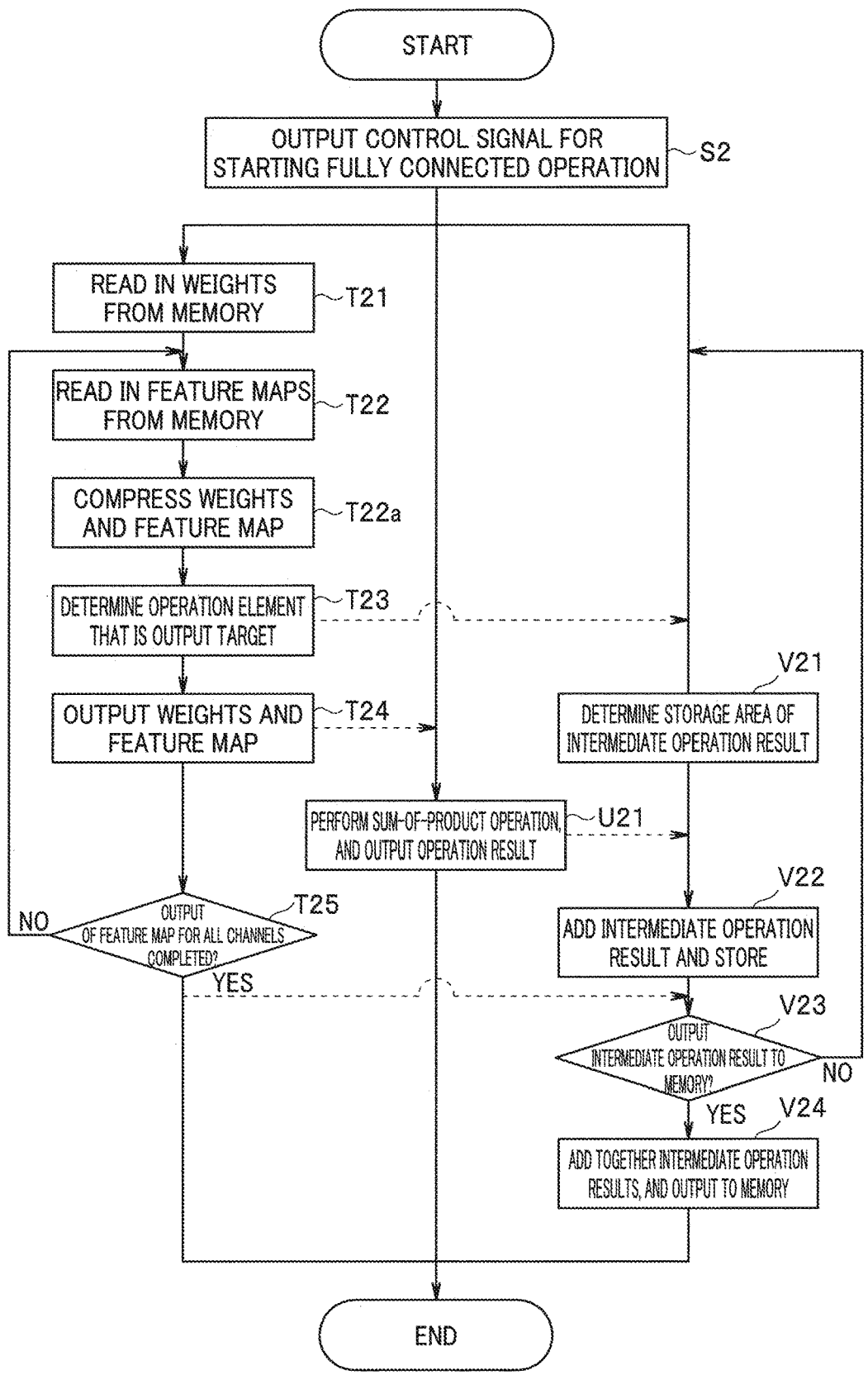
FIG. 13 is a flowchart for describing an example of a fully connected operation of an operation system according to a second embodiment.

FIG. 13 is a flowchart for describing an example of a fully connected operation Fc of the operation system 1 according to a modification of the first embodiment. In the present modification, the operation device 3 includes a weight compression circuit 12a and a feature value compression circuit 13a (chain double-dashed line in FIG. 1).

When 0 values are included in the weights W read from the memory 2, the weight compression circuit 12a deletes the 0 values, compresses the weights W, and outputs the compressed weights W to the weight output circuit 12. The weight compression circuit 12a outputs compression position information with respect to the weights W to the feature value compression circuit 13a.

Based on the compression position information inputted to the feature value compression circuit 13a, the feature value compression circuit 13a deletes feature values x that are at compression positions of the weights W and outputs a feature map X in which the feature values x are compressed to the feature value output circuit 13 (T22a).

The operation instruction circuit 11 generates output destination information in accordance with the compression position information and an operation element M that is the output destination, and outputs the generated information to the storage area instruction circuit 31 through the control circuit 51. That is, the weight compression circuit 12a compresses the weights W by deleting 0 values included in the weights W, and outputs the compression position information. Further, the feature value compression circuit 13a compresses the feature map X by deleting values included in the feature map X in accordance with the compression position information. By the above-described manner, a calculation amount at the operation device 3 can be reduced.

(Second Embodiment)

Although in the first embodiment and the modification of the first embodiment, the operation instruction circuit 11 is configured to, in the convolution operation Cv, after performing scanning in the x direction and the y direction within the feature map X, slide in the z-direction and perform scanning in the next x direction and the y direction, the operation instruction circuit 11 may be configured to, after performing scanning in the z-direction, slide in either one of the x-direction and y-direction, and perform the next scanning in the z-direction. In the description of the present embodiment, descriptions of components that are the same as components in other embodiments or modifications are omitted.

For example, by scanning in the z-direction, the operation device 3 sequentially adds an intermediate operation result Ic to a value in the area B1 and stores the resulting value in the area B1, and after the z-direction scanning is performed, outputs the intermediate operation result Ic from the area B1 to the memory 2, and clears the area B1. Next, the operation instruction circuit 11 slides in the x-direction, and by means of the next z-direction scanning, sequentially adds an intermediate operation result Ic to a value in the area B1 and stores the resulting value in the area B1. By the above-described manner, the area B in the operation device 3 can be made even smaller.

(Modification of Second Embodiment)

Although in the first and second embodiments and the modification of the first embodiment, the operation types are the convolution operation Cv and the fully connected operation Fc, the operation types may be operations that have different scanning directions to each other. In the description of the present modification, descriptions of components that are the same as components in other embodiments or modifications are omitted.

For example, the first operation may be a convolution operation Cv that is performed by scanning in the x direction and the y direction, and thereafter sliding in the z-direction and performing the next scanning in the x direction and the y direction and reading the feature map X, and the second operation may be a convolution operation Cv that is performed by scanning in the z-direction, and thereafter sliding in x-direction or y-direction and performing the next scanning in the z-direction and reading the feature map X.

For the first operation, a configuration may be adopted so that, by performing scanning in the x direction and the y direction, areas that are read multiple times in an overlapping manner such as areas x12, x13, x22, x23, x32 and x33 that overlap in FIG. 5 and FIG. 6, are read only once. The number of reading actions can be reduced by reutilizing the read values for use in multiples operations. On the other hand, in the second operation, by performing scanning in the z-direction, a space of the area B that is used can be reduced.

By the above-described manner, in accordance with the feature map X, the operation device 3 can perform the first operation when reducing the number of reading actions from the memory 2, and can perform the second operation when reducing the space of the area B that is used.

(Third Embodiment)

Next, a third embodiment will be described. In the description of the present embodiment, descriptions of components that are the same as components in other embodiments or modifications are omitted.

Figure 14:
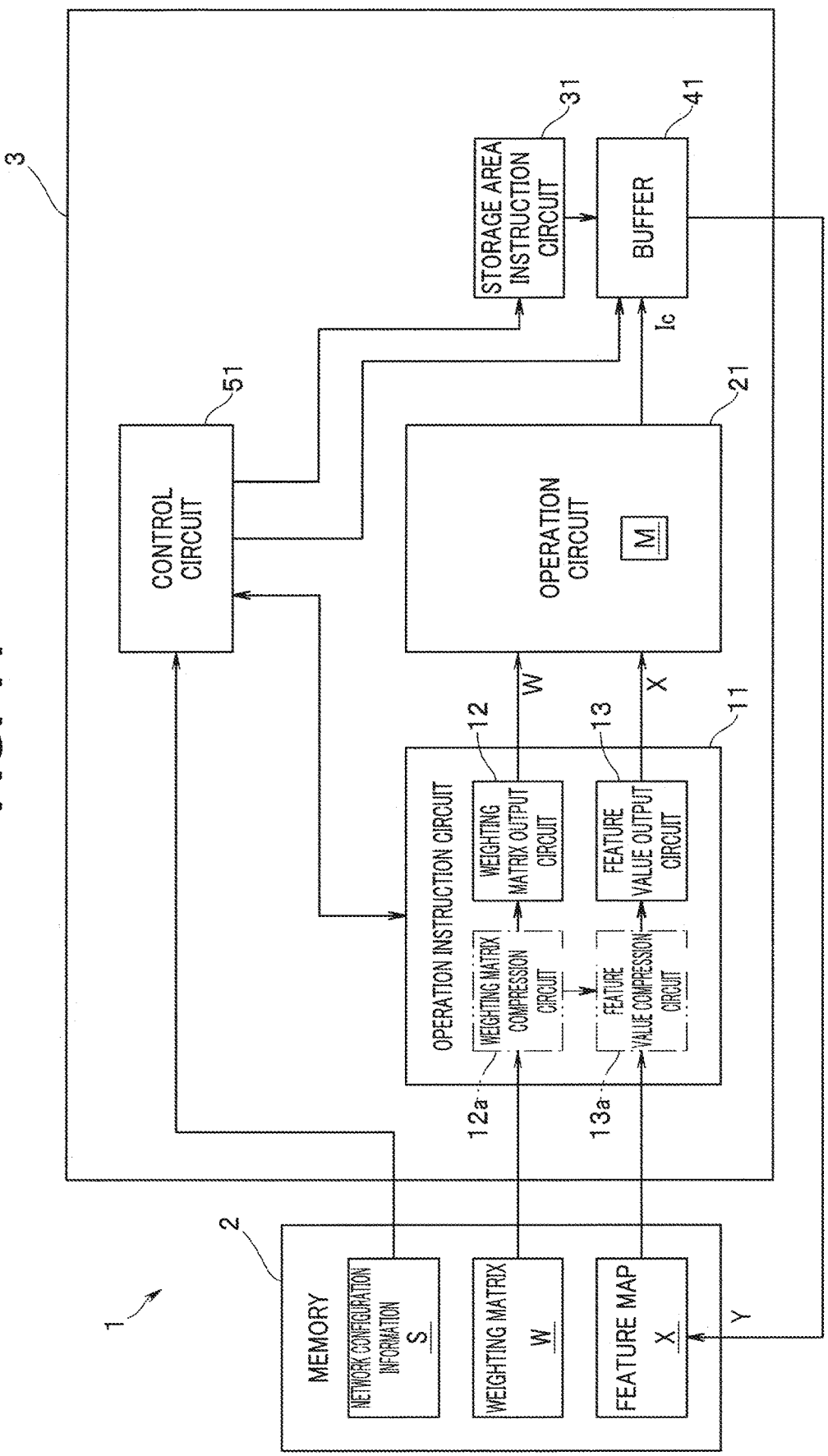
FIG. 14 is a block diagram illustrating an example of the configuration of an operation system according to a third embodiment.

FIG. 14 is a block diagram illustrating an example of the configuration of the operation system 1 according to the third embodiment.

As illustrated in FIG. 14, the network configuration information S, weighting matrixes W and feature maps X are stored in the memory 2. The network configuration information S includes weighting matrix identification information that is identification information for the weighting matrixes W. The term "weighting matrixes W" denotes all or a part of weighting matrixes.

Figure 15:
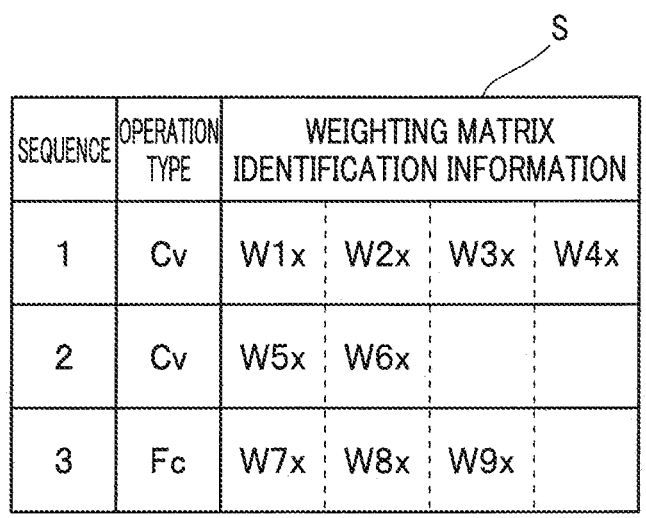
FIG. 15 is a table for describing an example of an operation sequence of the operation system according to the third embodiment.

FIG. 15 is a table for describing an example of an operation sequence of the operation system 1 according to the third embodiment.

As illustrated in FIG. 15, for the operation performed in sequential order 1, the operation device 3 reads feature maps X that are set in advance and weighting matrices W1x, W2x, W3x and W4x that are in accordance with the weighting matrix identification information from the memory 2, performs a convolution operation Cv, and writes an operation result Y to the memory 2. Next, for the operation performed in sequential order 2, the operation device 3 reads the operation result Y obtained by the operation in sequential order 1 from the memory 2, and performs a convolution operation Cv with respect to the operation result Y and weighting matrixes W5x and W6x that are read from the memory 2. Next, for the operation performed in sequential order 3, the operation device 3 reads the operation result Y that has been written in the memory 2 by the operation in sequential order 2 from the memory 2 as a feature map X, and also reads weighting matrixes W7x, W8x and W9x from the memory 2, performs a fully connected operation Fc, and writes the operation result Y that is the final output to the memory 2.

In accordance with an operation type and weight identification information inputted from the control circuit 51, the operation instruction circuit 11 reads the weighting matrixes W and feature maps X from the memory 2, and issues an operation instruction to perform either the first operation or the second operation by outputting the weighting matrixes W and the feature maps X that are read to the operation circuit 21.

In accordance with the operation instruction, the operation circuit 21 performs an operation by means of the operation element M with respect to the inputted weighting matrixes W and feature maps X, and outputs the intermediate operation result Ic to the buffer 41.

Based on the inputted operation type and output destination information, the storage area instruction circuit 31 determines an area B in which the intermediate operation result Ic is stored, and specifies the area B to the buffer 41.

Based on the instruction from the storage area instruction circuit 31, the buffer 41 adds the value of the intermediate operation result Ic to a value stored in the area B, and stores the result obtained by the addition in the designated area B once more. When the predetermined operation ends, the buffer 41 outputs the value stored in the area B designated by the storage area instruction circuit 31 to the memory 2 as the operation result Y.

Based on the network configuration information S read from the memory 2, the control circuit 51 outputs an operation type and weighting matrix identification information to the operation instruction circuit 11. Further, the control circuit 51 outputs the operation type and information regarding the output destination inputted from the operation instruction circuit 11 to the storage area instruction circuit 31.

Note that, in the embodiment, the buffer 41 is configured so that the amount of power consumption at the time of an access becomes less than the amount of power consumption of the memory 2 at the time of an access, thus the power consumption of the operation device 3 can be suppressed. For example, when the memory 2 is constituted by an off-chip DRAM, the buffer 41 is constituted by either an on-chip SRAM or a register. Further, when the memory 2 is constituted by an on-chip DRAM, the buffer 41 is constituted by either an on-chip SRAM or a register. Further, when the memory 2 is constituted by an on-chip SRAM, the buffer 41 is constituted by a register.

(Convolution Operation Cv)

Figure 16:
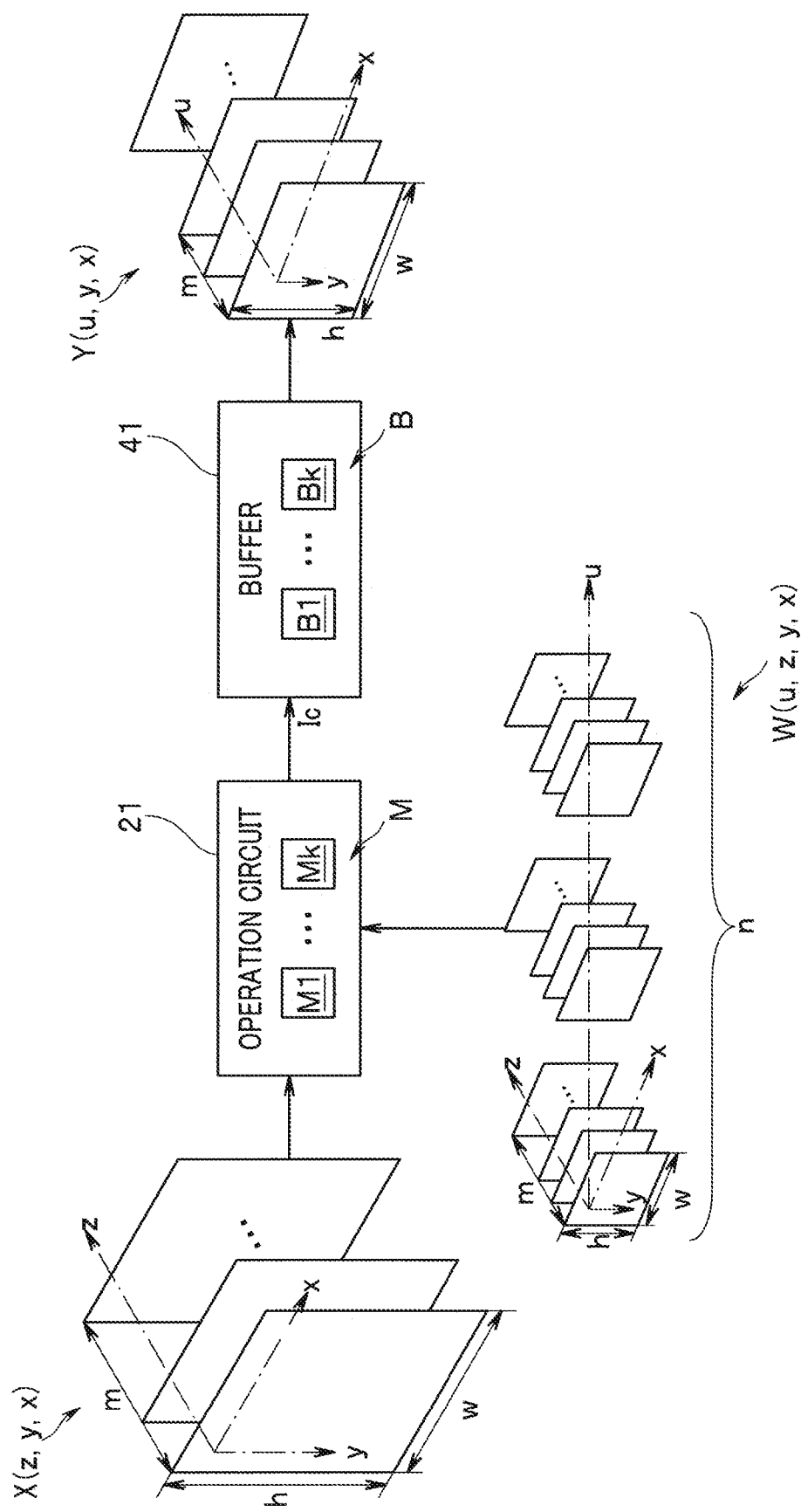
FIG. 16 is a view for describing an example of a convolution operation of the operation system according to the third embodiment.
Figure 17:
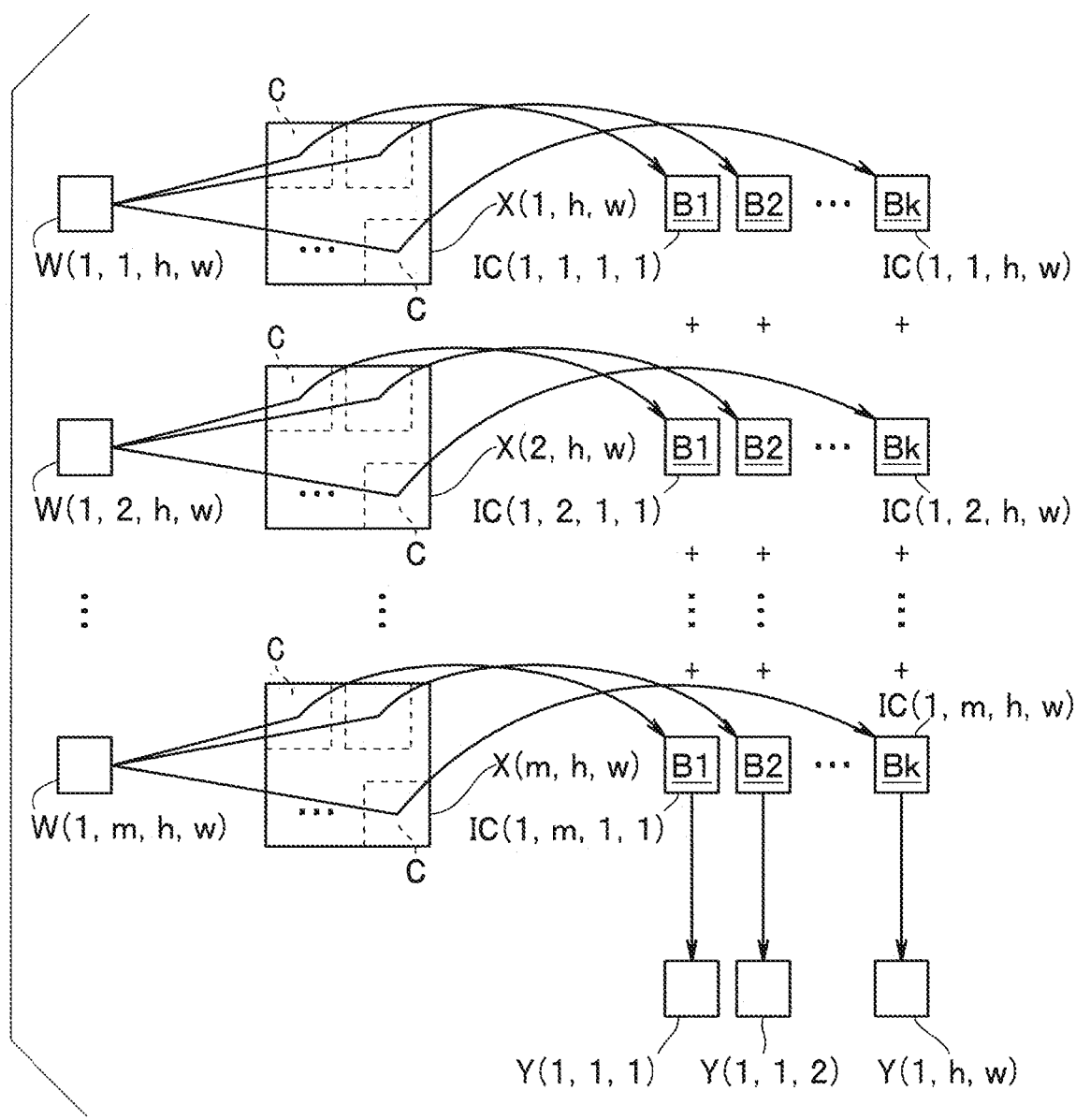
FIG. 17 is a view for describing an example of a convolution operation of the operation system according to the third embodiment.
Figure 18:
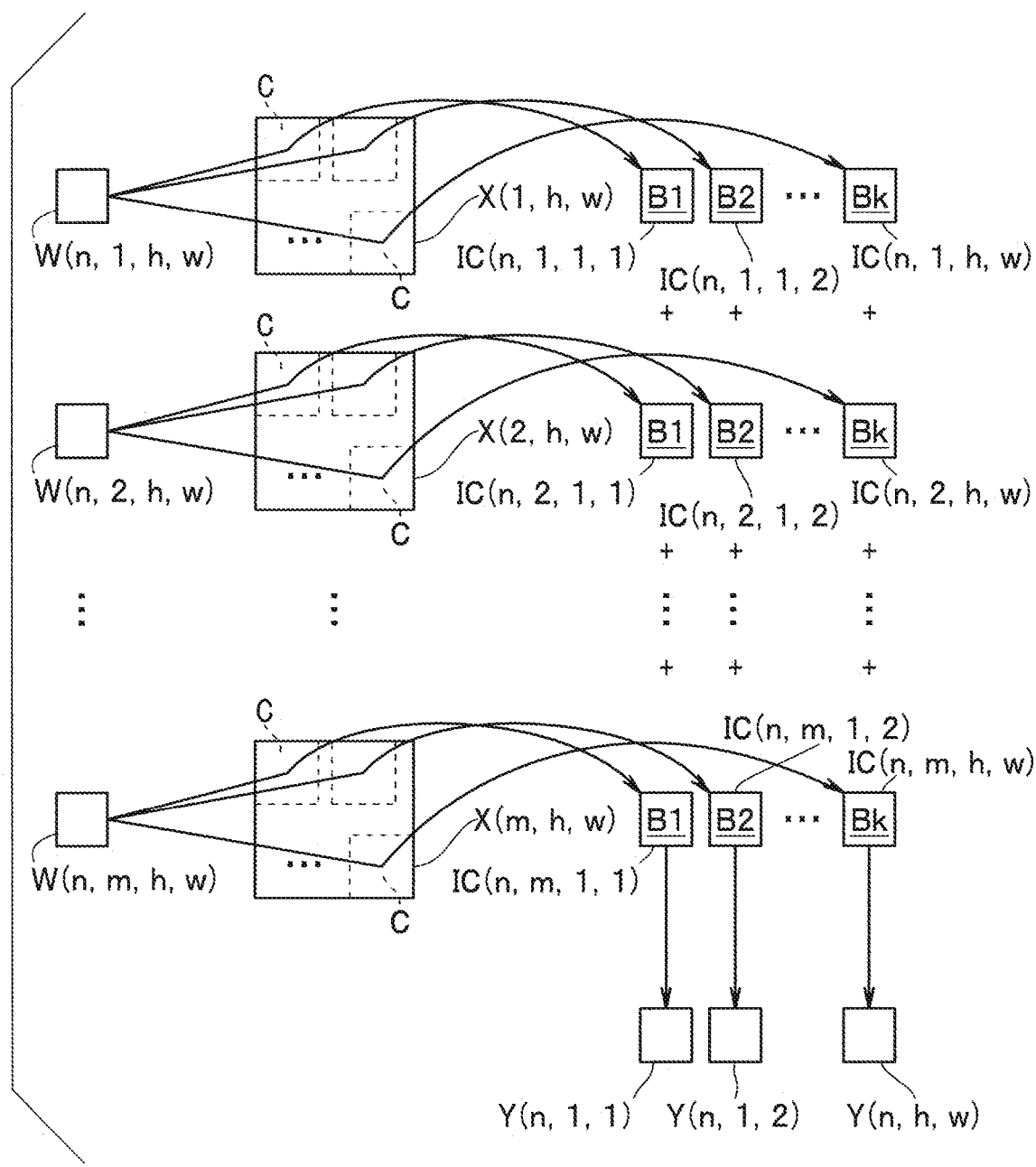
FIG. 18 is a view for describing an example of a convolution operation of the operation system according to the third embodiment.

FIG. 16 to FIG. 18 are explanatory diagrams for describing an example of the convolution operation Cv of the operation system 1 according to the third embodiment.

As illustrated in FIG. 16, in the convolution operation Cv, feature maps X and a weighting matrixes W are inputted to the operation circuit 21.

The feature maps X of the convolution operation Cv are defined by three-dimensional x-y-z coordinates, where the z-direction represents the number of channels m, the y-direction represents the number of rows h, and the x-direction represents the number of columns w.

The weighting matrix W of the convolution operation Cv is defined by four-dimensional x-y-z-u coordinates, where the u-direction represents the number of sets n, the z-direction represents the number of channels in, the y-direction represents the number of rows h, and the x-direction represents the number of columns w. The number of channels m of the weighting matrix W is the same as the number of channels in of the feature map X. The number of rows h and the number of columns w of the weighting matrix W need not be the same as the number of rows h and the number of columns w of the feature map X.

The intermediate operation result is of the convolution operation Cv is defined by four-dimensional x-y-z-u coordinates, where the u-direction represents the number of sets n, the z-direction represents the number of channels in, the y-direction represents the number of rows h, and the x-direction represents the number of columns w.

The operation result Y of the convolution operation Cv is defined by three-dimensional x-y-u coordinates, where the u-direction represents the number of channels n, the y-direction represents the number of rows h and the x-direction represents the number of columns w. The number of channels n of the operation result Y is the same as the number of sets n of the weighting matrix W. The sizes of the number of rows h and the number of columns w are determined according to the number of sliding positions of the weighting matrix W, and the number of rows h and the number of columns w of the feature map X.

In the description of the embodiments and modifications, the terms "feature map x(z,y,x)", "weighting matrix W(u,z,y,x)", "intermediate operation result Ic(u,z,y,x)" and "operation result Y(u,y,x)" indicate elements in the respective axial directions by means of the coordinates shown within the brackets. For example, the term "feature map X(1,2,3)" indicates an element in the first channel (z=1), the second row (y=2), and the third column (x=3) of the feature map X.

The number of areas B is determined according to the number of correspondence areas C that are provided within the channels of the feature map X.

The operation circuit 21 performs the convolution operation Cv based on a two-dimensional matrix (y, x coordinates) in accordance with the channel (z coordinate) in the feature map X, and a two-dimensional matrix (y, x coordinates) in accordance with the set (u coordinate) and channel (z coordinate) in the weighting matrix W, and calculates an intermediate operation result Ic(u,z,y,x). Next, the operation circuit 21 obtains the sum of the elements of the intermediate operation results Ic(u,z,y,x) in the z-direction, and calculates an operation result Y(u,y,x).

In the example shown in Equation (3), a convolution operation Cv is performed with respect to a weighting matrix W(1, 1, 1 to 3, 1 to 3) of three rows and three columns in the first set and the first channel and a feature map X(1, 1 to 3, 1 to 3) of the first channel, and an intermediate operation result Ic(1,1,1,1) for the first set, the first channel, the first row, and the first column is calculated. As illustrated in FIG. 17, the calculated intermediate operation result Ic(1,1,1,1) is stored in the area B1.

$$Ic(1,1,1,1)=W(1,1,1,1){\times}X(1,1,1)+W(1,1,1,2){\times}X(1,1,2)+W(1,1,1,3){\times}X(1,1,3)+W(1,1,2,1){\times}X(1,2,1)+\ldots+W(1,3,3){\times}X(1,3,3) \quad (3)$$

Equation (4) shows an example in which the correspondence areas C of the feature map X are slid by one position in the x-direction. In the example in Equation (4), a convolution operation Cv is performed with respect to the weighting matrix W(1, 1, 1 to 3, 1 to 3) and the feature map X(1, 2 to 4, 2 to 4) to calculate an intermediate operation result Ic(1,1,1,2) for the first set, the first channel, the first row, and the second column. The calculated intermediate operation result Ic(1,1,1,2) is stored in the area B2.

$$Ic(1,1,1,2)=W(1,1,1,1){\times}X(1,1,2)+W(1,1,1,2){\times}X(1,1,3)+W(1,1,1,3){\times}X(1,1,4)+W(1,1,2,1){\times}X(1,2,2)+\ldots+W(1,3,3){\times}X(1,3,4) \quad (4)$$

As illustrated in FIG. 17, the operation circuit 21 scans the inside of the feature map X in the x direction and the y direction, calculates intermediate operation results Ic(u=1, z=1, y=1 to h, x=1 to w), and stores the intermediate operation results Ic in any of the areas B1 to Bk in accordance with the x-y coordinates.

Next, after sliding in the z-direction within the feature map X, the operation circuit 21 scans in the x direction and the y direction, calculates intermediate operation results Ic(1, 2, 1 to h, 1 to w), and cumulatively adds and stores the intermediate operation results is in any of the areas B1 to Bk in accordance with the x-y coordinates.

The sum of the elements in the z-direction of the intermediate operation results Ic is calculated by cumulatively adding the intermediate operation results Ic of the feature map X having the number of channels m to values in the areas B1 to Bk, and an operation result Y(u=1, y=1 to h, x=1 to w) for one channel is calculated as illustrated in the examples of the following Equations (5) to (7).

$$Y(1,1,1)=\{Ic(1,1,1,1)+Ic(1,2,1,1)+\ldots+(1,m,1,1)\} \quad (5)$$

$$Y(1,1,2)=\{Ic(1,1,1,2)+Ic(1,2,1,2)+\ldots+(1,m,1,2)\} \quad (6)$$

$$Y(1,h,w)=\{Ic(1,1,h,w)+Ic(1,2,h,w)+\ldots+(1,m,h,w)\} \quad (7)$$

In the example in FIG. 17, the operation result Y(1,1,1) is generated in the area B1, the operation result Y(1,1,2) is generated in the area B2 and the operation result Y(1,h,w) is generated in the area. Bk.

After the operation result Y(1, 1 to h, 1 to w) for one channel is calculated, an operation is performed based on the weighting matrix W(2, 1 to m, 1 to h, 1 to w) and feature map X(1 to m, 1 to h, 1 to w) of the second set, and an operation result Y(2, 1 to h, 1 to w) is calculated.

The weighting matrix W is slid to sets 1 to n in the u-direction, and as illustrated in FIG. 18, when operations are repeated until an operation result Y(n, 1 to h, 1 to w) of the $n^{th}$ channel is calculated, an operation result Y(1 to n, 1 to h, 1 to w) is calculated.

Figure 19:
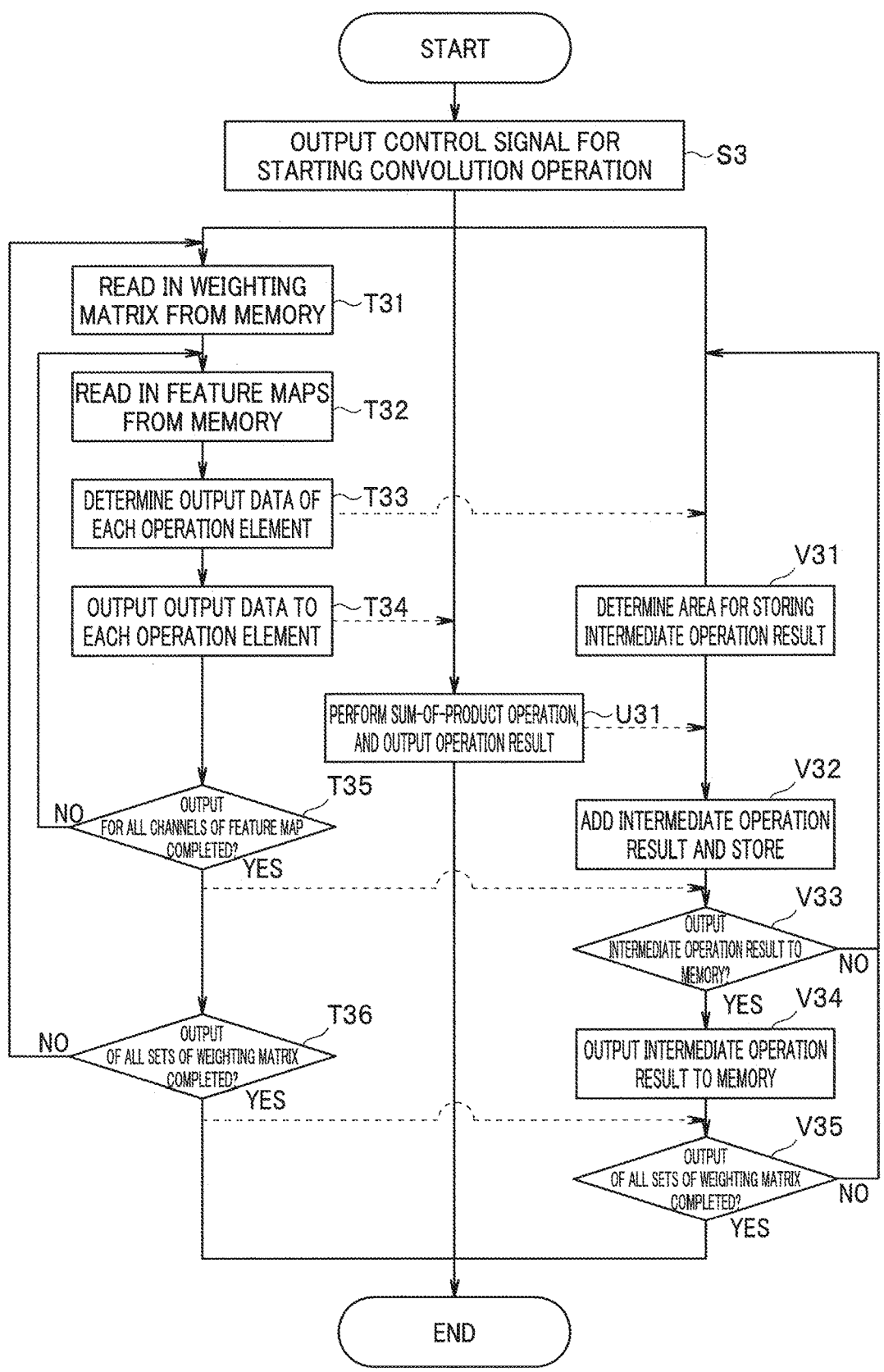
FIG. 19 is a flowchart for describing an example of a convolution operation of the operation system according to the third embodiment.

FIG. 19 is a flowchart for describing an example of operations for the convolution operation Cv of the operation system 1 according to the third embodiment.

The control circuit 51 outputs a control signal for starting a convolution operation Cv (S3). Based on the network configuration information S read from the memory 2, the control circuit 51 outputs information regarding the operation type that indicates the convolution operation Cv, and weighting matrix identification information to the operation instruction circuit 11.

The operation instruction circuit 11 reads one set of the weighting matrix W from the memory 2 (T31).

The operation instruction circuit 11 reads the feature map X for one channel from the memory 2 (T32).

The operation instruction circuit 11 determines the output data for each operation element M (133). Specifically, the operation instruction circuit 11 determines, as the output data for the respective operation elements M, a weighting matrix W(u, z, 1 to h, 1 to w) to be used for the operation and a map extracted from the feature map X, a size of which is the same as the size of the two-dimensional matrix of the weighting matrix W from the current slide position. For example, the operation instruction circuit 11 determines a weighting matrix W(1, 1, 1 to 3, 1 to 3) and a feature map X(1, 1 to 3, 1 to 3) as the output data for the operation element M1. Further, the operation instruction circuit 11 is slid, for example, one position in the x-direction, and determines a weighting matrix W(1, 1, 1 to 3, 1 to 3) and a feature map X(1, 2 to 4, 2 to 4) as the output data for the operation element M2. The information indicating the output destination of the output data is outputted to the storage area instruction circuit 31 through the control circuit 51.

The operation instruction circuit 11 outputs output data to each of the operation elements M (T34).

The operation instruction circuit 11 determines whether or not outputting of all channels of the feature maps X is completed (T35). If outputting of all channels of the feature maps X is not completed (T35—No), the operation instruction circuit 11 returns to T32, and advances the channel to be taken as the processing object of the feature maps X by one channel in the z-direction. By repeating the processing in T32 to T35, the feature value output circuit 13 reads the feature map X from the memory 2 for each channel. For example, in the first processing of the repeated processing, the feature value output circuit 13 reads a feature map X(1, 1 to h, 1 to w). At the $m^{th}$ repetition, the feature value output circuit 13 reads a feature map X(m, 1 to h, 1 to w). On the other hand, when outputting of all channels of the feature maps X is completed (T35—Yes), the operation instruction circuit 11 outputs a control signal for outputting the intermediate operation results Ic to the memory 2, to the buffer 41 through the control circuit 51, and proceeds to T36.

The operation instruction circuit 11 determines whether or not outputting of all sets of the weighting matrix W is completed (T36). If outputting of all sets of the weighting matrix W is not completed (T36—No), the operation instruction circuit 11 returns to T31 and slides the set to be taken as the processing object of the weighting matrix W in the u-direction. In contrast, when outputting of all sets of the weighting matrix W is completed (T36—Yes), the operation instruction circuit 11 outputs a control signal indicating that outputting of all sets of the weighting matrix W is completed to the buffer 41 through the control circuit 51, and ends the processing.

That is, in the convolution operation Cv, the operation instruction circuit 11 reads a weighting matrix W(u, z, 1 to h, 1 to w) from the memory 2 in accordance with the set and the channel undergoing processing, and also reads correspondence areas C of the feature map X corresponding to the slide position being processed from the memory 2. More specifically, after the operation instruction circuit 11 performs reading of the feature map X by scanning the inside of the feature map X in the x direction and the y direction, the position for scanning is slid in the z-direction and the next scanning in the x direction and the y direction of the feature map X is performed. After sliding in the z-direction is finished, the operation instruction circuit 11 slides the weights W in the u-direction and performs the next scanning in the x direction and the y direction of the feature map X.

At the operation circuit 21, a sum-of-product operation with respect to the inputted weighting matrixes W and feature maps X is performed by the operation elements M, and an intermediate operation result Ic is outputted to the buffer 41 (U31).

Based on information indicating the output destination of the output data inputted from the operation instruction circuit 11, the storage area instruction circuit 31 determines an area B in which the intermediate operation result Ic is stored (V31). That is, in the convolution operation Cv, an area B of the intermediate operation result Ic is determined in accordance with the correspondence areas C (result of operation for each block).

The buffer 41 adds the intermediate operation result Ic to the value in the area B that is determined and stores the resulting value in the area B (V32).

The buffer 41 determines whether or not to output the intermediate operation result Ic to the memory 2 based on a control signal inputted from the operation instruction circuit 11 in T35 (V33). When the result in V33 is "No", the buffer 41 returns to V31. On the other hand, when the result in V33 is "Yes", the processing advances to V34.

The buffer 41 outputs the intermediate operation result Ic to the memory 2 (V34). After the intermediate operation result Ic is outputted to the memory 2, the area B is cleared. That is, in the convolution operation Cv, when the processing in the z-direction is finished, the buffer 41 outputs data for the processed channels for the operation result Y stored in the area B based on the intermediate operation result is to the memory 2.

Based on the control signal inputted from the operation instruction circuit 11 in T36, the buffer 41 determines whether or not outputting for all sets of the weighting matrix W is completed (V35). If outputting for all sets of the weighting matrix W is not completed (V35—No), the buffer 41 returns to V31. On the other hand, when outputting for all sets of the weighting matrix W is completed (V35—Yes), the processing ends.

(Fully Connected Operation Fc)

Figure 20:
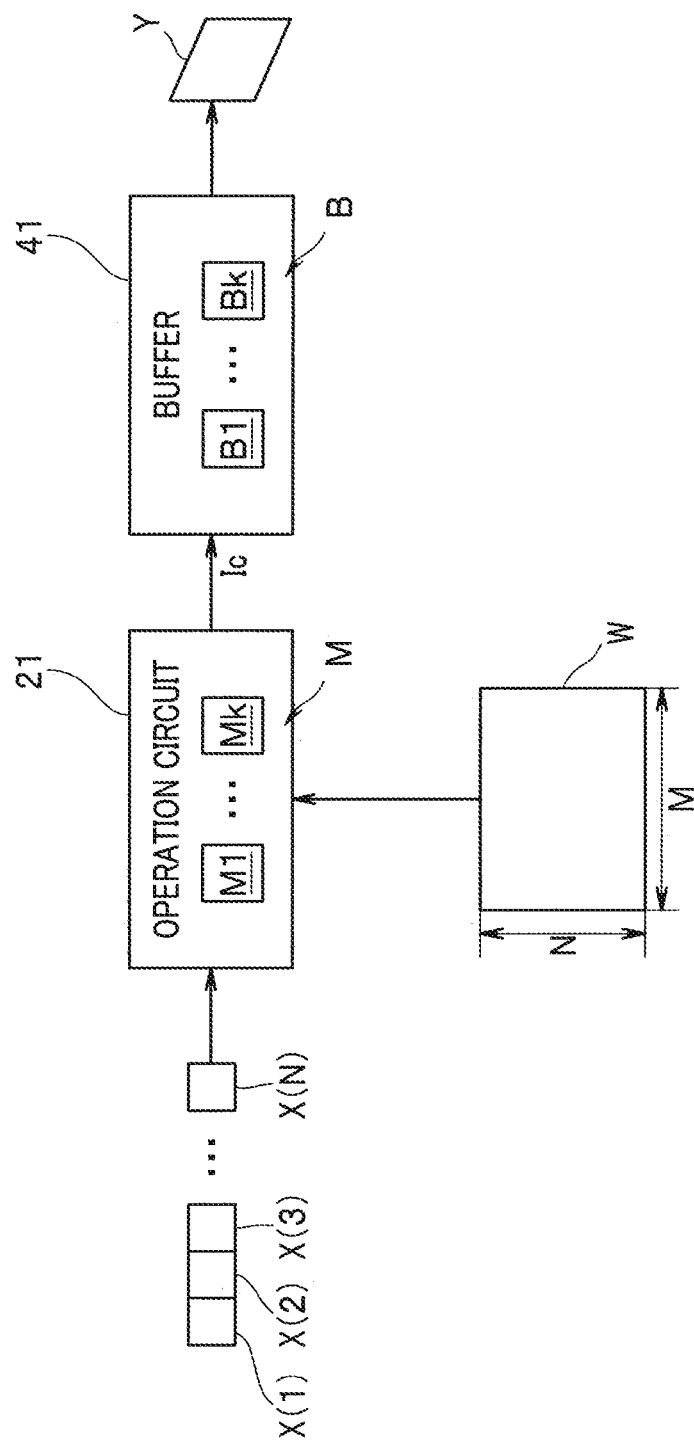
FIG. 20 is a view for describing an example of a fully connected operation of the operation system according to the third embodiment.
Figure 21:
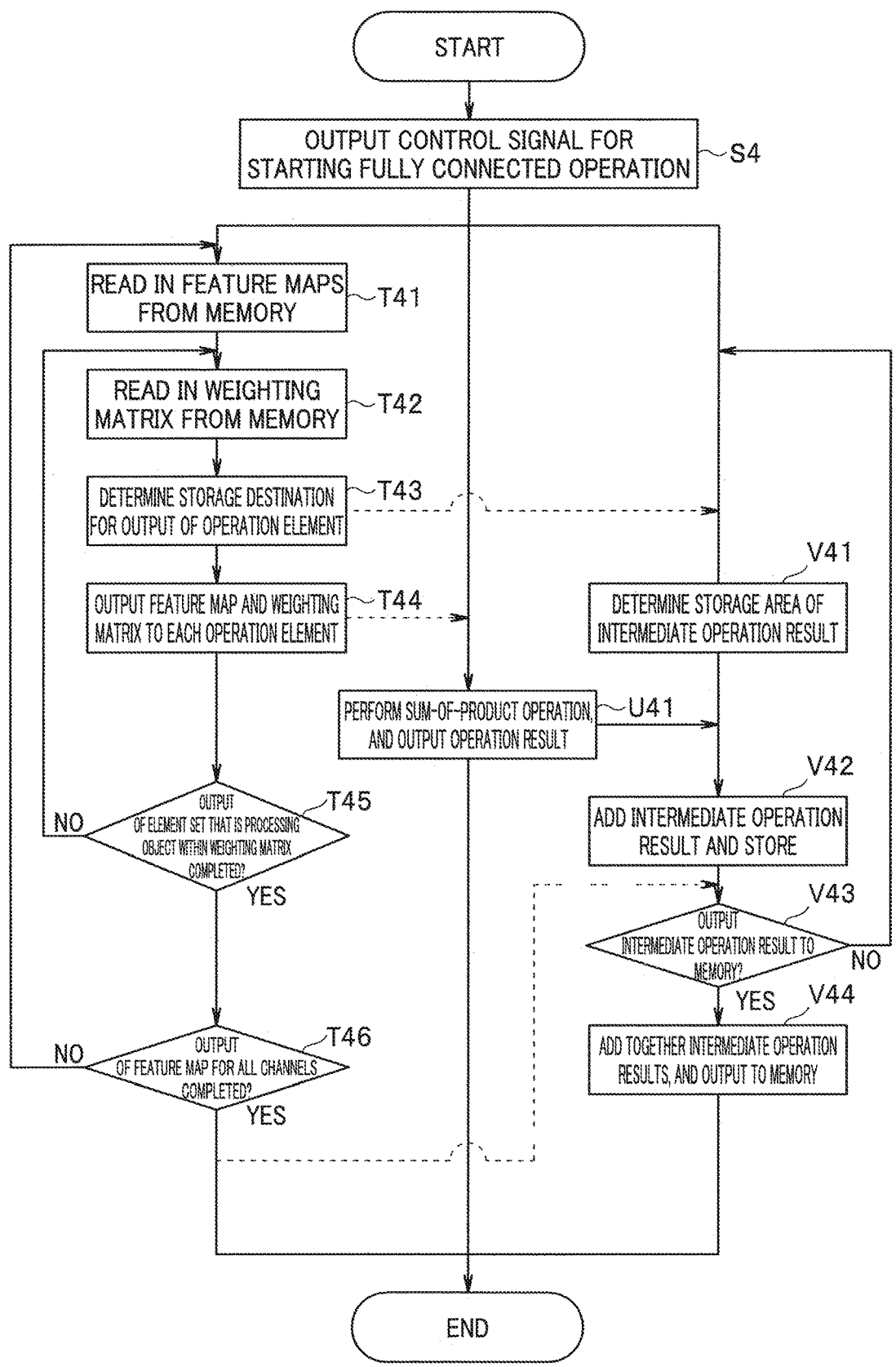
FIG. 21 is a flowchart for describing an example of a fully connected operation of the operation system according to the third embodiment.

A fully connected operation Fc of the operation system 1 will now be described. FIG. 20 and FIG. 21 are explanatory diagrams for describing an example of the fully connected operation Fc of the operation system 1 according to the third embodiment.

The fully connected operation Fc uses feature maps X that are one-dimensional data having N channels, and a weighting matrix W that is two-dimensional data having N rows and M columns. In the fully connected operation Fc, the number of channels N of the feature maps X is the same as the number of rows N of the weighting matrix W.

In the fully connected operation Fc, operation results Y(1) to Y(M) that are represented by the following Equation (8) are outputted. Note that, in the fully connected operation Fc, the total value of the operation results Y(1) to Y(M) may be outputted as an operation result Y.

[Math. 1]

$$[Y(1) \ Y(2) \ \ldots \ Y(M)] = [X(1) \ X(2) \ \ldots \ X(N)] \times \begin{bmatrix} W(1,1) & \ldots & W(1,M) \\ \vdots & \ddots & \vdots \\ W(N,1) & \ldots & W(N,M) \end{bmatrix} \quad (8)$$

As illustrated in FIG. 20, in the fully connected operation Fc, the feature maps X(1) to X(N) of N channels and the weighting matrix W(1 to N, 1 to M) composed of N rows and M columns are used. The operation circuit 21 performs an operation by means of operation elements M1 to Mk, and outputs intermediate operation results Ic to the buffer 41. The buffer 41 stores the intermediate operation results Ic in areas B1 to Bk.

Next, the flow of the fully connected operation Fc of the operation system 1 will be described.

FIG. 21 is a flowchart for describing an example of the fully connected operation Fc of the operation system 1 according to the third embodiment.

The control circuit 51 outputs a control signal for starting the fully connected operation Fc (S4). Based on the network configuration information S read from the memory 2, the control circuit 51 outputs information regarding the operation type that indicates the fully connected operation Fc, and weighting matrix identification information to the operation instruction circuit 11.

The operation instruction circuit 11 reads a feature map X from the memory 2 (T41). In accordance with the current channel counter n, the operation instruction circuit 11 reads a value of a feature map X(n) that is in accordance with the channel counter n from the memory 2. The channel counter n is incremented by one each time processing of the loop from T41 to T46 is performed.

The operation instruction circuit 11 reads the weighting matrix W from the memory 2 (T42). The operation instruction circuit 11 reads a weighting matrix W(N,m) to W(N, m+predetermined number of operation elements) in accordance with the current set counter m of the weighting matrix W from the memory 2. The term "predetermined number of operation elements" refers to the number of operation elements M to be used for the fully connected operation Fc that is set in advance. The set counter m is incremented by one each time processing of the loop from T42 to T45 is performed.

Figure 22:
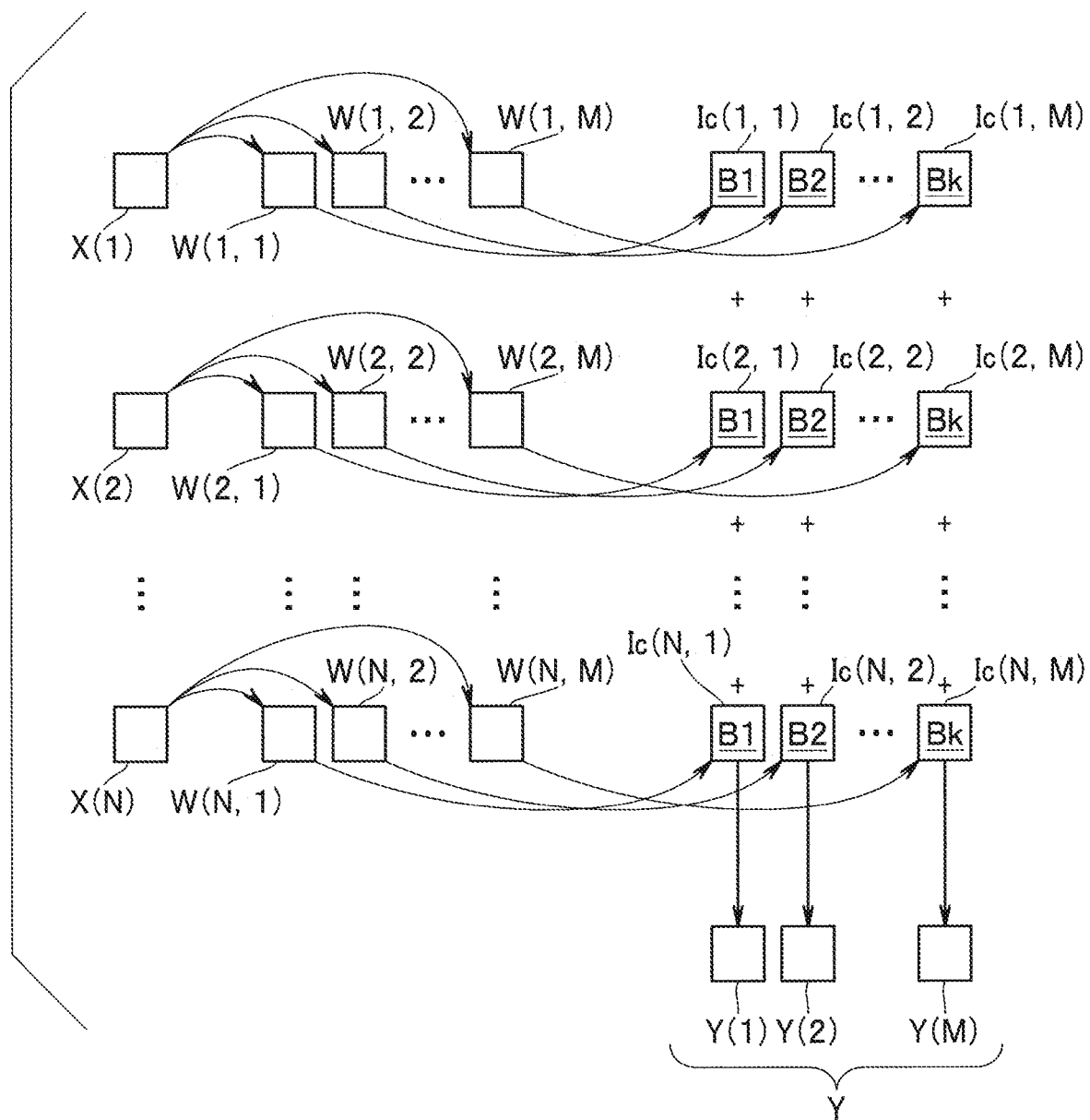
FIG. 22 is a view for describing an example of a fully connected operation of the operation system according to the third embodiment.

The operation instruction circuit 11 determines the storage destination for the output of the operation elements M (T43). As illustrated in FIG. 22, in the fully connected operation Fc, the feature map X(n) is multiplied by each weighting matrix W(n, m+predetermined number of operation elements) in accordance with the channel counter n (n=1 to N), and respective intermediate operation results Ic(n, m+predetermined number of operation elements) are cumulatively added to values of the areas 131 to Bk of the buffer 41. The respective areas B1 to Bk in which the intermediate operation results Ic(n, m+predetermined number of operation elements) are stored are determined in accordance with the number of columns 1 to M of the weighting matrix W.

The operation instruction circuit 11 outputs the feature map X(n) and the weighting matrix W(n, m+predetermined number of operation elements) to the respective operation elements M (T44).

The operation instruction circuit 11 determines whether or not outputting of the element set that is the processing object within the weighting matrix W is completed (T45). When the set counter m is equal to or greater than the number of columns M, the operation instruction circuit 11 determines that outputting of the weighting matrix W(n, 1 to M) as the element set that is the processing object has been completed. If outputting of the weighting matrix W(n, 1 to M) has not been completed, the operation instruction circuit 11 adds the predetermined number of operation elements to the set counter m, and the processing returns to T42. On the other hand, when outputting of the weighting matrix W(n, 1 to M) that is the processing object has been completed, the processing proceeds to T46.

The operation instruction circuit 11 determines whether or not outputting for all channels of the feature maps X is completed (T46). When the channel counter n is equal to or greater than the number of rows N, the operation instruction circuit 11 determines that outputting for all channels of the feature maps X is completed. If outputting for all channels of the feature maps X is not completed, the operation instruction circuit 11 increments the channel counter n by 1, and the processing returns to T41. When outputting for all channels of the feature maps X is completed, the operation instruction circuit 11 outputs a control signal for outputting the intermediate operation results Ic to the memory 2, to the buffer 41 through the control circuit 51, and the processing ends.

The processing in U41 and V41 to V43 is the same as the processing in U31 and V31 to V33, and hence a description of the processing will be omitted here.

The buffer 41 adds together the intermediate operation results Ic, and outputs the resultant value to the memory 2 (V44). That is, in the fully connected operation Fc, when an operation that is based on all channels of the feature maps X ends, the buffer 41 outputs the intermediate operation results Ic to the memory 2.

The operation device 3 changes the method for reading the weighting matrix W and the feature map X at the operation instruction circuit 11, and the respective areas B that store the operation results Y in the buffer 41 depending on the operation type. For example, in the convolution operation Cv, the respective areas B1 to Bk are determined according to the x-y coordinates of the feature map X. In the fully connected operation Fc, the respective areas B1 to Bk are determined according to the number of columns 1 to M of the weighting matrix W.

More specifically, in the convolution operation Cv, the operation instruction circuit 11 outputs the weighting matrix W and correspondence areas C that are associated with the weighting matrix W within the feature map X to the operation circuit 21, determines areas B within the buffer 41 in which the intermediate operation results Ic are stored according to the x-y coordinates of the correspondence areas C within the feature map X, and specifies the areas B to the storage area instruction circuit 31.

Further, in the fully connected operation Fc, the operation instruction circuit 11 outputs the feature map X, and an element set associated with the feature map X within the weighting matrix W to the operation circuit 21, determines areas B within the buffer 41 in which the intermediate operation results Ic are stored according to the element set within the weighting matrix W, and specifies the areas B to the storage area instruction circuit 31.

By the above-described manner, with respect to both the convolution operation Cv and the fully connected operation Fc, it is possible to execute the operations without writing the intermediate operation results Ic in the memory 2. Further, it is possible to execute both of the operations using the smaller number of buffers 41 than in a case where a dedicated buffer 41 is provided for each of the two operations.

Accordingly to the third embodiment, in the operation device 3, a plurality of types of operation are realized using the same buffer 41, and no intermediate operation results Ic are saved to the memory 2, the frequencies of reading and writing are reduced and power consumption is suppressed.

(Modification of Third Embodiment)

Although in the third embodiment the operation device 3 performs an operation with respect to all of the weighting matrixes W and feature maps X read from the memory 2, operations with respect to 0 values may be omitted when 0 values are included in the weighting matrix W. In the description of the present modification, descriptions regarding components that are the same as components in the embodiments are omitted.

In the present modification, the operation device 3 includes a weighting matrix compression circuit 12a and the feature value compression circuit 13a (chain double-dashed line in FIG. 14).

When 0 values are included in the weighting matrix W read from the memory 2, the weighting matrix compression circuit 12a deletes the 0 values, compresses the weighting matrix W, and outputs the compressed weighting matrix W to a weighting matrix output circuit 12. The weighting matrix compression circuit 12a outputs compression position information with respect to the weighting matrix W to the feature value compression circuit 13a.

Based on the inputted compression position information, the feature value compression circuit 13a deletes elements that are at compression positions of the weighting matrix W, and outputs the compressed feature map X to the feature value output circuit 13.

The operation instruction circuit 11 calculates information regarding the output destination in accordance with the compression position information and operation element M that is the output destination, and outputs the information to the storage area instruction circuit 31 through the control circuit 51. That is, the weighting matrix compression circuit 12a compresses the weighting matrix W by deleting 0 values included in the weighting matrix W, and outputs the compression position information. Further, the feature value compression circuit 13a compresses the feature map X by deleting values included in the feature map X in accordance with the compression position information. By the above-described manner, the calculation amount at the operation device 3 can be reduced.

(Fourth Embodiment)

Although in the foregoing embodiments and modifications, the operation instruction circuit 11 is configured to, when performing the convolution operation Cv, after performing scanning in the x direction and the y direction within the feature map X, slide in the z-direction and perform the next scanning in the x direction and the y direction, the operation instruction circuit 11 may be configured to, after performing scanning in the z-direction, slide in either one of the x-direction and y-direction, and perform the next scanning in the z-direction. In the description of the present embodiment, descriptions of components that are the same as components in other embodiments or modifications are omitted.

For example, by scanning in the z-direction, the operation device 3 sequentially adds intermediate operation results Ic to values in the buffer 41 and stores the resulting values in the buffer 41, and after the z-direction scanning is performed, outputs the intermediate operation results Ic from the buffer 41 to the memory 2. Next, the operation instruction circuit 11 slides in the x-direction, and by means of the next z-direction scanning, sequentially adds intermediate operation results Ic to values in the buffer 41 and stores the resulting values in the buffer 41. The storage destinations for the intermediate operation results Ic in the buffer 41 at the time are set in advance for the respective operation elements M. By the above-described manner, in the operation device 3, without providing areas B that correspond to the x-y coordinates on the buffer 41, the operation can be executed using areas B that correspond to the z coordinates, and thus the operation can be executed using the smaller number of buffers 41.

(Modification of Fourth Embodiment)

Although in the embodiments and modifications, the operation types are the convolution operation Cv and the fully connected operation Fc, the operation types may be operations with different scanning directions to each other. In the description of the present modification, descriptions of components that are the same as components in other embodiments or modifications are omitted.

For example, a first convolution operation Cv may be a convolution operation Cv that is performed by scanning in the x direction and the y direction and thereafter sliding in the z-direction and performing the next scanning in the x direction and the y direction and reading the feature map X, and a second convolution operation Cv may be a convolution operation Cv that is performed by scanning in the z-direction and thereafter sliding in the x-direction or y-direction and performing the next scanning in the z-direction and reading the feature map X.

Note that, a configuration may be adopted so that, in the first operation, by performing scanning in the x direction and the y direction, for example, when sliding in the x-direction with respect to a feature map X(1, 1, 2 to 5) or the like, consecutive elements in the x-direction are read only once, to thereby enable a reduction in the number of reading actions by reutilizing the feature maps X without the need to repeatedly read the consecutive elements from the memory 2 at each time sliding is performed. On the other hand, in the second operation, by performing scanning in the z-direction, the area B that is used in the buffer 41 can be reduced.

By the above-described mariner, in accordance with the feature map X, the operation device 3 can perform scanning in the order of scanning directions x, y, z when reducing the number of reading actions from the memory 2, and when reducing the area B that is used in the buffer 41, the operation device 3 can perform scanning in the order of scanning directions z, x, y.

Note that although in the modification of the embodiment the control circuit 51 outputs an operation type to the operation instruction circuit 11 based on the network configuration information S, the control circuit 51 may also be configured to detect a feature map X read from the memory 2, determine whether to perform ordering of the scanning directions, and output the operation type to the operation instruction circuit 11.

In all the embodiments described above, all the circuits may be formed by analog circuits, or formed by digital circuits, or analog circuits and digital circuits in a mixed manner. Furthermore, each circuit may be formed by an integrated circuit (IC), an application specific integrated circuit (ASIC) or a field-programmable gate array (FPGA). Part of all of the functions may be controlled by a program, and information processing by software may be specifically implemented using hardware resources.

For example, all the device may be formed by microprocessor and/or analog circuit implemented or implemented by a dedicated circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An operation device, comprising:
an operation instruction circuit configured to issue an operation instruction for an operation type of either one of a first operation and a second operation;
an operation circuit configured to perform an operation in accordance with the operation instruction, and output an intermediate operation result;
a buffer configured to store the intermediate operation result; and
a storage area instruction circuit configured to specify an area within the buffer in which the intermediate operation result is stored, according to the operation type, wherein the first operation is a convolution operation and the second operation is a fully connected operation, and wherein the operation instruction circuit issues the operation instruction by reading weights and feature values from a memory in accordance with an operation type of either one of the first operation and the second operation, and outputting the weights and the feature values that are read to the operation circuit.

2. The operation device according to claim 1, wherein:
in the convolution operation, the operation instruction circuit reads feature values of correspondence areas of a feature map corresponding to the weights from a memory.

3. The operation device according to claim 1, wherein:
the operation instruction circuit includes a weight compression circuit; and
the weight compression circuit compresses the weights by deleting 0 values that are included in the weights, and outputs compression position information that is information on a compression position.

4. The operation device according to claim 3, wherein:
the operation instruction circuit includes a feature value compression circuit; and
the feature value compression circuit compresses the feature values by deleting values included in the feature values in accordance with the compression position information.

5. The operation device according to claim 1, wherein:
the weights are constituted by a two-dimensional array defined by x-y coordinates.

6. The operation device according to claim 1, further comprising a control circuit, wherein:
the control circuit determines an order of scanning directions based on the feature values and issues an instruction for the scanning directions to the operation instruction circuit.

7. The operation device according to claim 1, wherein:
in the convolution operation, a sum-of-product operation is performed based on the weights and correspondence areas corresponding to the weights in the feature values; and
the correspondence areas are scanned by repeating sliding on the feature values by a predetermined number of sliding positions.

8. The operation device according to claim 7, wherein:
the predetermined number of sliding positions is two or more.

9. An operation device, comprising:
an operation instruction circuit configured to issue an operation instruction for an operation type of either one of a first operation and a second operation, wherein the operation instruction circuit issues the operation instruction by reading weights and feature values from a memory in accordance with the operation type of either one of the first operation and the second operation, wherein the weights are a weighting matrix, and outputting the weights and the feature values that are read to an operation circuit;
the operation circuit configured to perform an operation in accordance with the operation instruction, and output an intermediate operation result;
a buffer configured to store the intermediate operation result; and
a storage area instruction circuit configured to specify an area within the buffer in which the intermediate operation result is stored, according to the operation type.

10. The operation device according to claim 9, wherein:
the operation instruction circuit includes a weight compression circuit; and
the weight compression circuit compresses the weights by deleting 0 values that are included in the weights, and outputs compression position information that is information on a compression position.

11. The operation device according to claim 10, wherein:
the operation instruction circuit includes a feature value compression circuit; and
the feature value compression circuit compresses the feature values by deleting values included in the feature values in accordance with the compression position information.

12. The operation device according to claim 9, wherein:
the weights are constituted by a two-dimensional array defined by x-y coordinates.

13. The operation device according to claim 9, further comprising a control circuit, wherein:
the control circuit determines an order of scanning directions based on the feature values and issues an instruction for the scanning directions to the operation instruction circuit.

14. An operation system comprising:
a memory configured to store network configuration information and weights;
a control circuit configured to acquire the network configuration information from the memory, and output an operation type of either one of a first operation and a second operation and weight identification information, according to the network configuration information;
an operation instruction circuit configured to acquire the weights that are associated with the weight identification information from the memory, and issue an operation instruction for the operation type using the weights;
an operation circuit configured to perform an operation in accordance with the operation instruction, and output an intermediate operation result;
a buffer configured to store the intermediate operation result; and
a storage area instruction circuit configured to specify an area within the buffer to store the intermediate operation result, according to the operation type.

15. The operation system according to claim 14, wherein:
the first operation is a convolution operation;
the memory stores a feature map; and
in the convolution operation, the operation instruction circuit reads the feature values of correspondence areas of the feature map corresponding to the weights from the memory.

* * * * *